United States Patent
Song et al.

(10) Patent No.: US 10,205,884 B2
(45) Date of Patent: Feb. 12, 2019

(54) MOBILE TERMINAL AND METHOD FOR CONTROLLING THE SAME

(71) Applicant: LG ELECTRONICS INC., Seoul (KR)

(72) Inventors: Yoomee Song, Seoul (KR); Jungmin Park, Seoul (KR); Yoonseok Yang, Seoul (KR); Jaehwa Lee, Seoul (KR); Hyerim Ku, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 37 days.

(21) Appl. No.: 15/272,061

(22) Filed: Sep. 21, 2016

(65) Prior Publication Data
US 2017/0289458 A1  Oct. 5, 2017

(30) Foreign Application Priority Data
Mar. 31, 2016 (KR) ........................ 10-2016-0039587

(51) Int. Cl.
*H04N 5/225* (2006.01)
*H04N 5/232* (2006.01)
*G06F 3/0488* (2013.01)

(52) U.S. Cl.
CPC ....... *H04N 5/23293* (2013.01); *G06F 3/0488* (2013.01); *H04N 5/2258* (2013.01);
(Continued)

(58) Field of Classification Search
None
See application file for complete search history.

(56) References Cited

U.S. PATENT DOCUMENTS

| 8,593,555 B1 * | 11/2013 | Chun ................. H04N 5/23216 348/333.01 |
| 2002/0197067 A1 * | 12/2002 | Ohnishi ............... G11B 27/105 386/230 |

(Continued)

FOREIGN PATENT DOCUMENTS

JP   2003030675   1/2003

OTHER PUBLICATIONS

European Patent Office Application Serial No. 16202275.0, Search Report dated Jun. 21, 2017, 8 pages.

*Primary Examiner* — Twyler L Haskins
*Assistant Examiner* — Quan Pham
(74) *Attorney, Agent, or Firm* — Lee, Hong, Degerman, Kang & Waimey

(57) ABSTRACT

A mobile terminal and an operating method thereof are disclosed. The mobile terminal includes a terminal body, a memory; a display; a camera located at one side of the terminal body and having at least a first lens and a second lens; and a controller configured to activate both the first and second lenses to capture a subject via the first lens in a first capture direction and capture the subject via the second lens in a second capture direction concurrently in response to an input for operating the camera; cause the memory to store a first image captured in the first capture direction and a second image captured in the second capture direction; and cause the display to display at least one of the stored first or second image based on an actual capture direction corresponding to an orientation of the camera when the input is received.

19 Claims, 29 Drawing Sheets

(52) U.S. Cl.
CPC ..... *H04N 5/23216* (2013.01); *H04N 5/23238* (2013.01); *H04N 5/23296* (2013.01)

(56) References Cited

U.S. PATENT DOCUMENTS

| | | | |
|---|---|---|---|
| 2006/0098186 A1 | 5/2006 | Yumiki | |
| 2011/0242361 A1* | 10/2011 | Kuwahara | A63F 13/10 348/231.4 |
| 2011/0246942 A1* | 10/2011 | Misawa | G06F 3/04815 715/830 |
| 2012/0287315 A1 | 11/2012 | Huang et al. | |
| 2013/0083222 A1* | 4/2013 | Matsuzawa | H04N 5/23212 348/240.3 |
| 2013/0332856 A1* | 12/2013 | Sanders | G06F 3/0481 715/753 |
| 2014/0149934 A1* | 5/2014 | Bheemanna | G06F 3/038 715/810 |
| 2014/0334797 A1 | 11/2014 | Lee et al. | |
| 2015/0169166 A1* | 6/2015 | Kim | G06F 3/0488 715/838 |
| 2016/0007008 A1 | 1/2016 | Molgaard et al. | |
| 2018/0011844 A1* | 1/2018 | Park | G06F 3/04886 |

\* cited by examiner

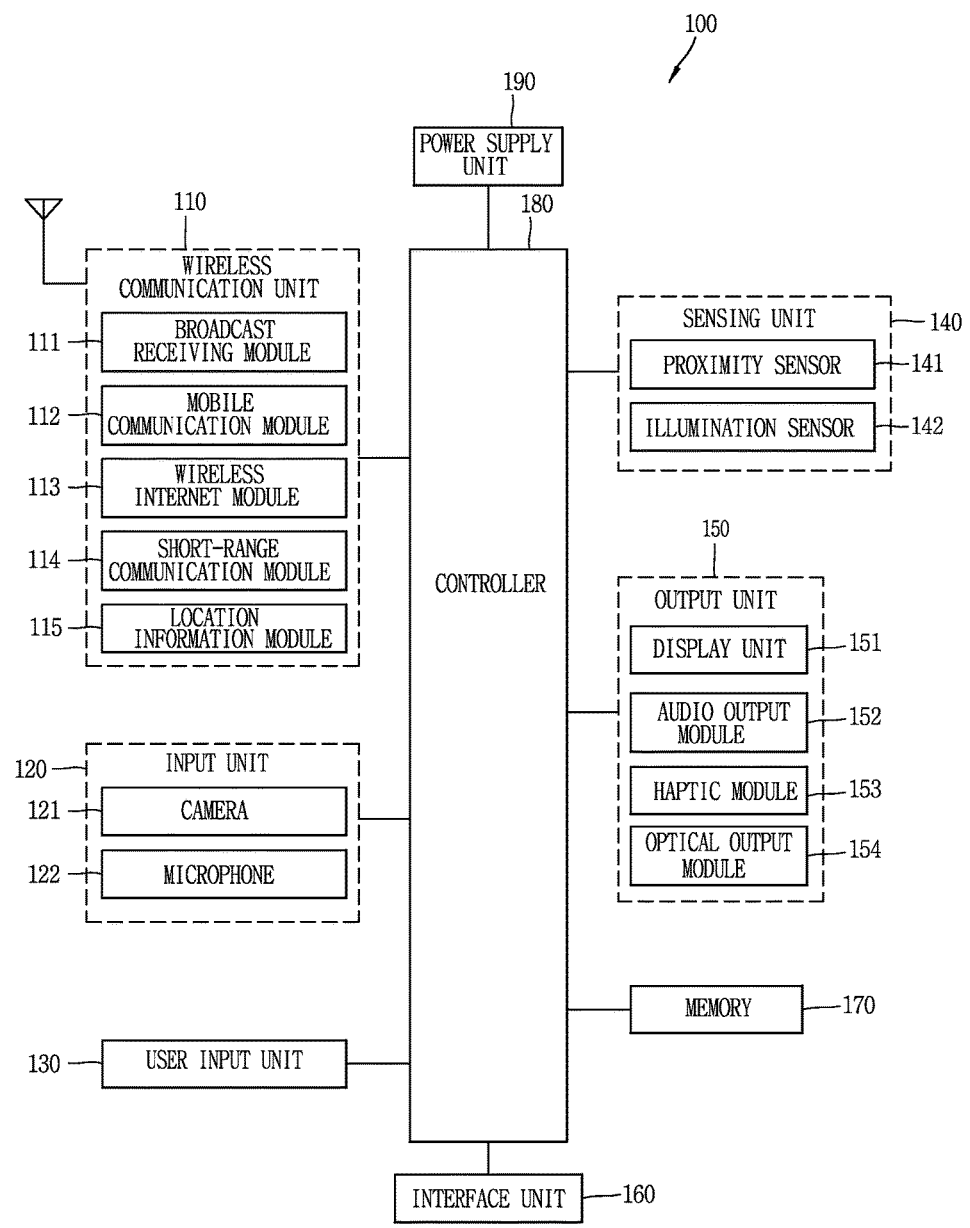

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2016-0039587, filed on Mar. 31, 2016, the contents of which are hereby incorporated by reference herein in its entirety.

BACKGROUND OF THE INVENTION

1. Field of the Invention

This specification relates to a mobile terminal having a camera capable of capturing a subject, and a method for controlling the same.

2. Background of the Invention

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

As one example, the mobile terminal can be provided with one or more cameras to capture (photograph) images. A user can acquire one image of a subject by capturing an image viewed on a preview screen while gripping the mobile terminal in a vertical (portrait) direction or a horizontal (landscape) direction. For example, when a capturing signal is input while gripping the mobile terminal in the vertical direction, one image captured in the vertical direction is acquired. On the other hand, when a capturing signal is input while gripping the mobile terminal in the horizontal direction, one image captured in the horizontal direction is acquired.

Meanwhile, as the camera of the mobile terminal becomes more multifunctional, continuous capturing, 360-degree capturing, panoramic capturing and the like are enabled through a single capturing signal. However, in those modes, the user acquires images of a subject which the subject is captured in the same direction as a direction that the user grips the mobile terminal, namely, images of the subject captured in the same direction as that in which the subject is currently viewed on the preview screen.

SUMMARY OF THE INVENTION

Therefore, an aspect of the detailed description is to provide a mobile terminal capable of simultaneously acquiring a plurality of images by capturing the same subject in different capture directions using a plurality of lenses, and an operating method thereof.

Another aspect of the detailed description is to provide a mobile terminal, capable of variously displaying a plurality of images captured in different directions into a user-desired style, and an operating method thereof.

Another aspect of the detailed description is to provide a mobile terminal, capable of accessing currently-non-displayed images captured in different directions in an easy and fast manner, and an operating method thereof.

To achieve these and other advantages and in accordance with the purpose of this specification, as embodied and broadly described herein, there is provided a mobile terminal including a terminal body; a memory; a display; and a camera located at one side of the terminal body and having at least a first lens and a second lens; a controller configured to: activate both the first and second lenses to capture a subject via the first lens in a first capture direction and capture the subject via the second lens in a second capture direction concurrently in response to receiving an input for operating the camera; cause the memory to store a first image captured in the first capture direction and a second image captured in the second capture direction; and cause the display to display at least one of the stored first or second image based on an actual capture direction corresponding to an orientation of the camera when the input is received.

In one embodiment, wherein the first image corresponds to an image of a preview screen including the subject such that the first capture direction is same as a direction of the image of the preview screen; the second capture direction is different from the first capture direction and the direction of the image of the preview screen; and when the first capture direction is a vertical direction, the second capture direction is a horizontal direction, and when the first capture direction is the horizontal direction, the second capture direction is the vertical direction.

In one embodiment, wherein the subject included in the first image is entirely included in the second image.

In one embodiment, the mobile terminal further comprising a sensing unit capable of sensing an output direction of the display, wherein the controller is further configured to cause the display to selectively display one of the stored first and second images based on the sensed output direction.

In one embodiment, wherein the controller is further configured to switch between the first image and the second image in response to change of the output direction caused by rotation of the terminal body such that the first image is displayed when the output direction corresponds to a portrait direction and the second image is displayed when the output direction corresponds to a landscape direction.

In one embodiment, wherein the controller is further configured to restrict the switching when the output direction is changed while a touch input is received via the display.

In one embodiment, wherein: the controller is further configured to cause the display to display a plurality of stored images; only one of the stored first and second images that corresponds to the actual capture direction is included in the plurality of displayed images as a representative image; and the other one of the stored first and second images having a capture direction that is different from the actual capture direction is hidden when the plurality of images are displayed.

In one embodiment, wherein: the controller is further configured to cause the display to display a popup window in response to a preset touch gesture received via the representative image while the plurality of images are displayed, the popup window displayed at a position adjacent to the representative image; and the popup window includes the hidden image having the different capture direction.

In one embodiment, wherein the controller is further configured to cause the display to display other images associated with at least the representative image or the hidden image and the hidden image on the popup window in a slideshow manner such that each of the other images and the hidden image is displayed one by one.

In one embodiment, wherein the controller is further configured to cause the display to display an image displayed on the popup window as a full size image in response to releasing of the preset touch gesture from the popup window, the full size image corresponding to the image displayed on the popup window at a moment when the preset touch gesture is released.

In one embodiment, wherein the controller is further configured to switch between the representative image and an image displayed on the popup window in response to dragging of the touch gesture to the popup window and releasing of the touch gesture from the popup window such that the representative image is switched to a hidden image displayed on the popup window and the image displayed on the popup window at a moment when the touch gesture is released from the popup window is switched to a new representative image included in the plurality of images, the representative image being replaced by the new representative image.

In one embodiment, wherein in response to a preset gesture input received while the first image is displayed, the controller is further configured to: cause the display to display the second image instead of the first image; or cause the display to display the first image to which the second image is added.

In one embodiment, wherein the controller is further configured to cause the display to display a thumbnail list including a first thumbnail image corresponding the stored first image and a second thumbnail image corresponding to the stored second image such that the first thumbnail image is displayed in a first shape corresponding to the first capture direction and the second thumbnail image is displayed in a second shape corresponding to the second capture direction.

In one embodiment, wherein the controller is further configured to cause the display to display the thumbnail list including only thumbnail images in the first shape in response to a touch input received via the first thumbnail image included in the thumbnail list.

In one embodiment, wherein the controller is further configured to: cause the display to selectively display thumbnail images corresponding to images captured in actual capture directions in response to a touch input received via one thumbnail image in the thumbnail list, the selectively displayed thumbnail images displayed in a distinguishable manner compared to other thumbnail images that are displayed with the selectively displayed thumbnail images; and set restriction of inputs with respect to the other thumbnail images such that a touch received via the other thumbnail images is not recognized as a touch input.

In one embodiment, wherein the controller is further configured to: cause the display to display a first thumbnail list including only images captured in the first capture direction; and cause the display to display a second thumbnail list including only images captured in the second capture direction or to display a third thumbnail list including both the images captured in the first capture direction and the images captured in the second capture direction in response to a drag touch input received in a horizontal direction via the thumbnail list.

In one embodiment, wherein the controller is further configured to: cause the display to display a thumbnail list including images captured in the first capture direction; and cause rows of the thumbnail list to be spaced by a predetermined gap in response to a two-finger touch input received via the thumbnail list and dragged in a first direction such that images captured in the second capture direction are displayed at the gap.

In one embodiment, wherein the controller is further configured to cause a first row of the thumbnail list at which the two-finger touch input is received and a second row that is adjacent to the first row in a direction facing the first direction to be spaced apart from each other in response to the two-finger touch input and the dragging in the first direction such that images captured in the second capture direction and corresponding to the first row are displayed at the gap.

In one embodiment, wherein the controller is further configured to cause the display to: display the stored first image; display information related to the stored second image in response to a preset touch gesture received via the display displaying the first image, the information displayed overlapping a portion of the first image; and display a quick view of the second image in response to a touch input received via a portion of the display at which the information is displayed.

In one embodiment, the mobile terminal further comprising a wireless communication unit, wherein the controller is further configured to cause the wireless communication unit to transmit both the first image and the second image in response to a transmission command that is received while one of the first and second images is displayed.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1A is a block diagram of a mobile terminal in accordance with one exemplary embodiment of the present invention;

DETAILED DESCRIPTION OF THE INVENTION

Figure 1B:
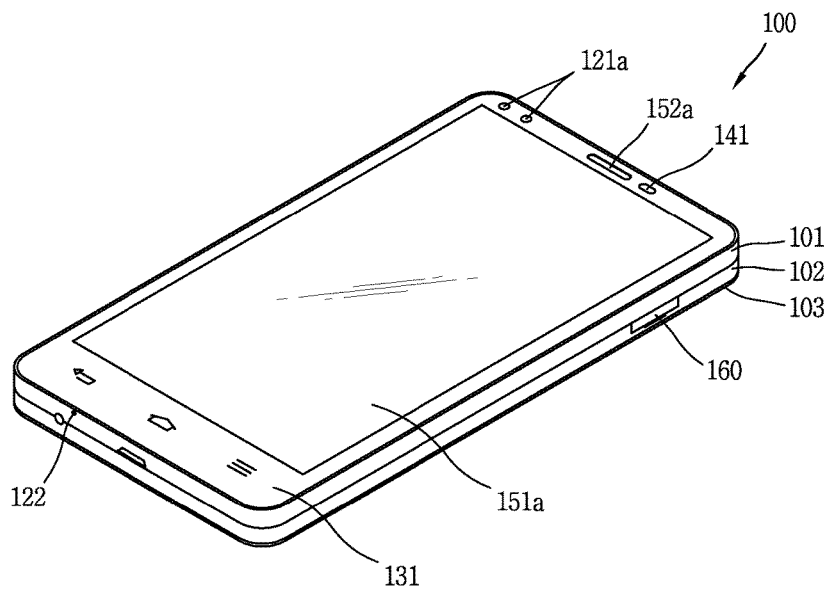
FIGS. 1B and 1C are conceptual views illustrating one example of a mobile terminal, viewed from different directions.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1C:
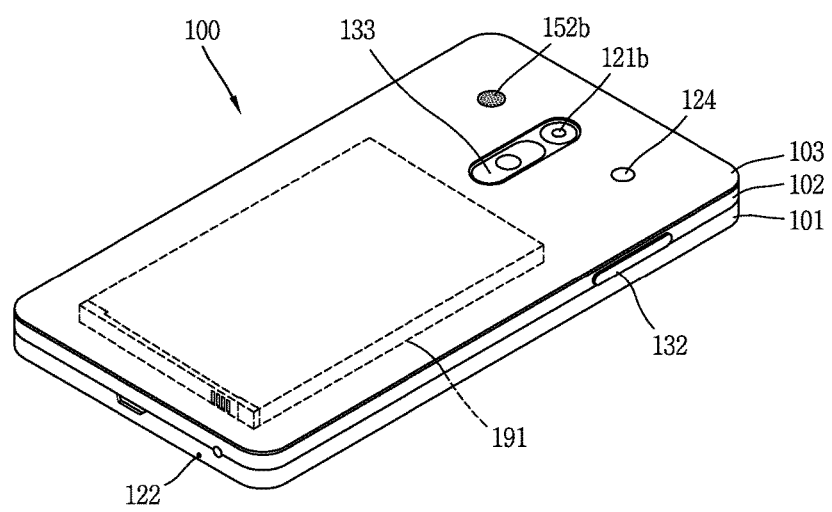

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a user input 130, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 130 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 130 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 130 is a component that permits input by a user. Such user input may enable the controller 180 to control operation of the mobile terminal 100. The user input unit 130 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sensing unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

Meanwhile, the touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors (TR) at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the flexible display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control an operation associated with an application program and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type the body of the portable electronic device. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of portable electronic device (for example, bar-type, watch-type, glasses-type, and the like). However, such teachings with regard to a particular type of portable electronic device will generally apply to other types of mobile terminals as well.

The body of the mobile terminal may be understood to indicate the mobile terminal 100 by regarding the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 131 and 132, a microphone 122, an interface unit 160, and the like.

Hereinafter, description will be given of the exemplary mobile terminal 100 in which the front surface of the terminal body is shown having the display unit 151, the first audio output module 152a, the proximity sensor 141, the illumination sensor, the optical output module, the first camera 121a, and the first manipulation unit 131, the side surface of the terminal body is shown having the second manipulation unit 132, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 131 may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as The user input unit 130 (see FIG. 1A). Therefore, the touch screen may replace at least some of the functions of the first manipulation unit 131.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 131 and 132 are examples of The user input unit 130, which may be manipulated by a user to provide input to the mobile terminal 100. The first and second manipulation units 131 and 132 may also be commonly referred to as a manipulating portion, and may employ any tactile method that allows the user to perform manipulation such as touch, push, scroll, or the like. The first and second manipulation units 131 and 132 may also employ any non-tactile method that allows the user to perform manipulation such as proximity touch, hovering, or the like.

FIG. 1B illustrates the first manipulation unit 131 as a touch key, but possible alternatives include a mechanical key, a push key, a touch key, and combinations thereof.

Input received at the first and second manipulation units 131 and 132 may be used in various ways. For example, the first manipulation unit 131 may be used by the user to provide an input to a menu, home key, cancel, search, or the like, and the second manipulation unit 132 may be used by the user to provide an input to control a volume level being output from the first or second audio output modules 152*a* or 152*b*, to switch to a touch recognition mode of the display unit 151, or the like.

Also, a front camera 121*a* having a plurality of lenses provided along a line may be disposed at an upper end of a front surface of the terminal body. However, the positions of the plurality of lenses are not limited to those, and the plurality of lenses may alternatively be located at different positions. FIG. 1B exemplarily illustrates that two lenses are arranged side by side along a row line, but more lenses may be disposed along a row line or in a matrix configuration.

Here, at least one of the plurality of lenses may be implemented as a lens having a wider viewing angle than a general viewing angle. Also, the plurality of lenses may have different pixel values.

Also, this embodiment illustrates that the plurality of lenses are provided merely at the front camera 121*a*, but the present invention may not be limited to this. Alternatively, a plurality of lenses may be provided at the rear camera 121*b* to be explained later or each of the front and rear cameras 121*a* and 121*b*.

As another example of The user input unit 130, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided at the rear surface of the terminal body, a new type of user interface using this may be implemented. Embodiments that include the rear input unit may implement some or all of the functionality of the first manipulation unit 131 in the rear input unit. As such, in situations where the first manipulation unit 131 is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in The user input unit 130.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capture direction that is substantially opposite to the image capture direction of the first camera unit 121*a*.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

A flash 124 is shown adjacent to the second camera 121*b*. When an image of a subject is captured with the camera 121*b*, the flash 124 may illuminate the subject.

The second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal 100 according to the embodiment of the present invention may include a camera that is provided on one side of the terminal body and includes at least first and second lenses. When a capturing signal with respect to the camera is received, the controller 180 of the mobile terminal 100 may simultaneously capture the same subject in different directions by operating the first and second lenses, thereby simultaneously acquiring a plurality of images by the single capturing signal.

Here, simultaneously capturing the same subject in different directions refers to capturing the same subject in at least two directions, of a landscape (horizontal) direction, a vertical (portrait) direction of the mobile terminal 100, and a diagonal direction having an angle formed between the horizontal and the vertical directions. In this instance, an image captured in the horizontal direction more shows a background image in the horizontal direction based on the subject, and an image captured in the vertical direction more shows a background image in the vertical direction based on the subject. Also, an image captured in the diagonal direction more shows a background image in the diagonal direction based on the subject.

Also, the controller 180 stores first and second images acquired according to the capturing result by recognizing capture directions thereof, respectively. For example, a first image captured in the horizontal direction and a second image captured in the vertical direction may be stored in a gallery application.

Here, storing by recognizing the capture directions refers to even storing capture direction information corresponding to each of the first and second images upon storing the first and second images. Also, the first and second images are images which have been captured at the same capture time point and show the same main subject (in this instance, actual capture time points of the first lens and the second lens in response to the same capturing signal may be slightly different from each other), and stored in a manner of being distinguished from a plurality of images which are acquired according to a plurality of capturing signals or a continuous capturing signal.

The first and second images which are simultaneously captured in the different directions may be differently recognized based on formal directions (horizontal, vertical and diagonal directions), or distinguished based on actual capture directions (an actual capture direction, a first direction different from the actual capture direction and a second direction different from the actual capture direction).

At least one of the thusly-stored first and second images, which have been simultaneously captured, may be output on the display unit 151 on the basis of the recognized capture direction.

In detail, when a plurality of images are output on the display unit 151 in response to an execution of the gallery application, only an image corresponding to an actual capture direction, of the first and second images, may be output. Or, only one of the first and second images, which has been captured in a specific direction (horizontal, vertical or diagonal direction) may be output. Or, a first image having a first capture direction and a second image having a second capture direction may all be displayed. Also, the controller 180 may output only images having a specific capture direction based on a user input, or add dual-captured images having different capture directions to the images, or switch previous images into images with a specific capture direction.

As described above, according to the embodiments of the present invention, a plurality of images may be acquired by capturing the same subject in different capture directions through a one-time capturing operation. Also, as will be described in detail hereinafter, the acquired plurality of images may be displayed based on each capture direction to facilitate a user to check, select, edit and arrange images having a specific capture direction.

Figure 2:
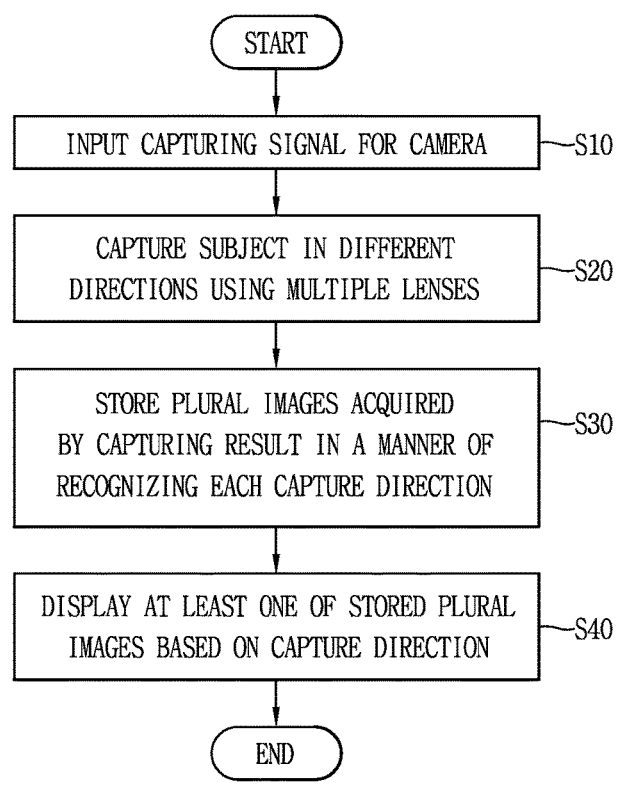
FIG. 2 is a flowchart representatively illustrating an operating method of a mobile terminal in accordance with the present invention.

Hereinafter, FIG. 2 is a flowchart representatively illustrating an operating method of the mobile terminal in accordance with the present invention.

First, the mobile terminal 100 receives a capturing signal with respect to the camera 121a having the plurality of lenses (S10). In this instance, as a previous step, a preview screen may be output on the display unit 151 of the mobile terminal 100, in response to an activation of the camera 121a having the plurality of lenses, and at least one subject may be included on the preview screen.

Here, the capturing signal may be input in various manners. For example, the capturing signal with respect to the camera may be generated in response to a user's voice command, an input of a shutter button, a preset gesture input, an automatic shutter operation or the like.

Next, the same subject is captured in a different direction using the plurality of lenses of the camera 121a (S20).

Here, the different direction may be one of a horizontal direction, a vertical direction and a diagonal direction based on the display unit 151 of the mobile terminal 100. Or, the different direction may be one of a direction which matches the preview screen output on the display unit 151 of the mobile terminal, namely, an actual capture direction, and other capture directions different from the actual capture direction.

For example, when the user captures a subject while gripping the display unit 151 in the horizontal direction, the mobile terminal 100 captures the subject in the horizontal direction using the first lens and simultaneously captures the subject in the vertical direction using the second lens. In this instance, a position of the subject included in an image captured in the horizontal direction may be the same as that of the subject included in an image captured in the vertical direction. To this end, the controller 180 of the mobile terminal 100 may appropriately adjust a layout of a virtual preview screen which is to be captured in a different capture direction from an actual capture direction, namely, in the vertical direction, on the basis of a position of a main subject included on the preview screen. Also, for employing a third lens, the same subject can be captured in a diagonal direction which is different from an actual capture direction.

Meanwhile, in another exemplary embodiment, the mobile terminal 100 may be configured to capture a subject using only one of the lenses provided in the camera when a first capturing signal corresponding to a first input is received, and capture the subject using all of the plurality of lenses provided in the camera only when a second capturing signal corresponding to a second input, which is different from the first input, is received.

Or, when a touch input is applied to the display unit 151 while capturing a subject, the mobile terminal 100 can capture the same subject in different directions using all of the plurality of lenses at the touch-applied time point.

In this manner, when the same subject is captured in the different capture directions, the controller 180 of the mobile terminal 100 may recognize each capture direction of a plurality of images obtained through the capturing and store the plurality of images (S30).

In detail, when storing a first image captured in a horizontal direction and a second image captured in a vertical direction, the controller 180 may store those images by including each capture direction information. Also, the controller 180 may recognize an actual capture direction and an image matching the actual capture direction for storage.

Afterwards, the mobile terminal 100 may display at least one of the stored plurality of images on the display unit 151 on the basis of the capture direction (S40).

For this, the controller 180 may process display conditions and/or display methods of the stored images in a manner of associating with each capture direction.

For example, the controller 180 may display only an image with a specific capture direction or an image corresponding to an actual capture direction, among a plurality of images which are simultaneously captured in different directions.

Or, the controller 180 may display all of a plurality of images simultaneously captured in different directions on a screen, and output each capture direction in an intuitively recognizable manner.

Or, the controller 180 may switch (convert) a currently-displayed image into an image captured in a different direction, on the basis of a preset input. That is, the controller 180 may change a current view style of a subject in a different manner.

As described above, a plurality of images captured in horizontal and vertical directions (and a diagonal direction) can simultaneously be acquired using a plurality of lenses, in response to a single capturing signal.

Hereinafter, FIGS. 3A to 3D illustrate detailed embodiments related to the step (S20) of capturing the subject in the different directions using the plurality of lenses.

Figure 3A:
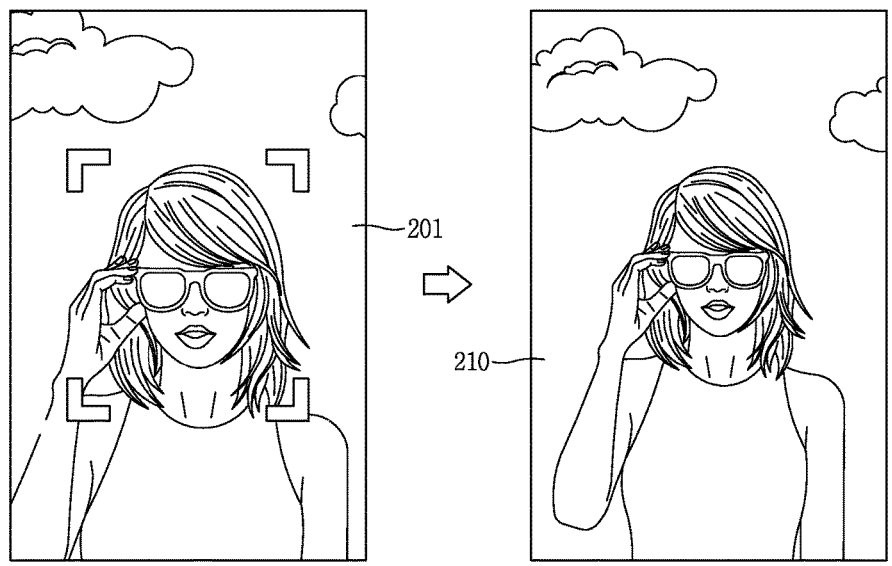
FIGS. 3A to 3D are conceptual views illustrating a method of simultaneously capturing a subject in horizontal (landscape) and vertical (portrait) directions using a plurality of lenses in the mobile terminal in accordance with the present invention.
Figure 3A:

FIG. 3A exemplarily illustrates an embodiment of capturing a displayed preview screen 201 while the mobile terminal 100 is gripped in a vertical direction. In the present invention, when a capturing command for the displayed preview screen 201 is received, a second image 220 captured in a horizontal direction as well as a first image 210 captured in the vertical direction can simultaneously be acquired.

Here, the first image 210 is an image captured in a capture direction corresponding to the preview screen 201 including a subject ('person'), and the second image 220 is an image captured in a capture direction opposite to the preview screen 201. In this instance, the second image captured in the vertical direction may have a view more extending in the horizontal direction than the preview screen 201. In addition, the simultaneously acquired first and second images 210 and 220 are stored in a preset storage space.

Figure 3B:
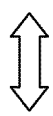

FIG. 3B illustrates positions of subjects in the simultaneously-acquired images. As illustrated in FIG. 3B, positions of subjects included in an image captured in an actual capture direction (e.g., vertical direction) are the same as those of the subjects in an image captured in a different capture direction (e.g., horizontal direction). For example, when a subject is located at a center (e.g., '5') in an image captured in a vertical direction, the subject is located at the center ('5') even in an image captured in a horizontal direction.

Figure 3C:
Figure 3C:
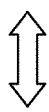
Figure 3C:
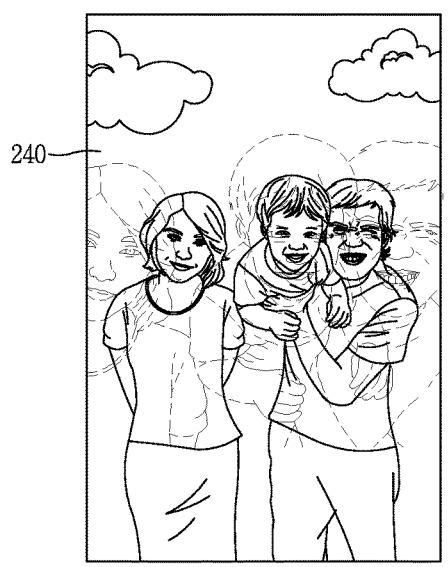

In relation to this, FIG. 3C illustrates an operation of the mobile terminal 100 when it is expected that subjects included in an image to be captured in an actual capture direction are not included in an image to be captured in a different capture direction when the subjects are captured in the different capture direction.

In this instance, the controller 180 of the mobile terminal 100 may automatically adjust a capturing option of the camera 121a in a manner that all of subjects included in a first image corresponding to an actual capture direction is included in a second image corresponding to a different capture direction from the actual capture direction, in response to an input of a capturing signal. Here, the capturing option may include zoom-in or zoom-out of at least one of a plurality of lenses, a ratio of zoom-in/out, an adjustment of a layout, and the like.

In detail, referring to FIG. 3C, when a plurality of subjects included in an image 230 captured in a horizontal direction are not all included in an image upon being captured in a vertical direction, the mobile terminal 100 disclosed herein may automatically execute a zoom-out function with respect to a lens to capture the subjects in the vertical direction. Accordingly, the plurality of subjects included in the image 230 captured in the horizontal direction can all be included even in an image 240 captured in the vertical direction. Similar to this, when one subject is partially cut off, the zoom-out function with respect to a corresponding lens may be executed and capturing can be carried out accordingly.

Although not illustrated, on the other hand, when a part of a subject is cut off on a preview screen corresponding to an actual capture direction, a zoom-out, a zoom-out ratio and the like can be adjusted such that the subject is fully included without being cut off in an image corresponding to an opposite direction to the actual capture direction. That is, although an image is captured in an actual capture direction in a state that a part of a subject is cut off, the subject can all be included in a different capture direction without being partially cut off by virtue of the automatic activation of the capturing option.

Also, when a part of a subject is cut off in an image corresponding to one of a first capture direction and a second capture direction, as aforementioned, an object (e.g., icon, etc.) notifying an activation of a related capturing option may be output on the display unit 151. For example, while the zoom-out function is executed, an icon that the zoom-out function is current activated may be output on an upper end of a preview screen.

Also, the controller 180 may manually adjust a capturing option of an image which is to be captured in a capture direction different from an actual capture direction, in response to a user input.

Figure 3D:
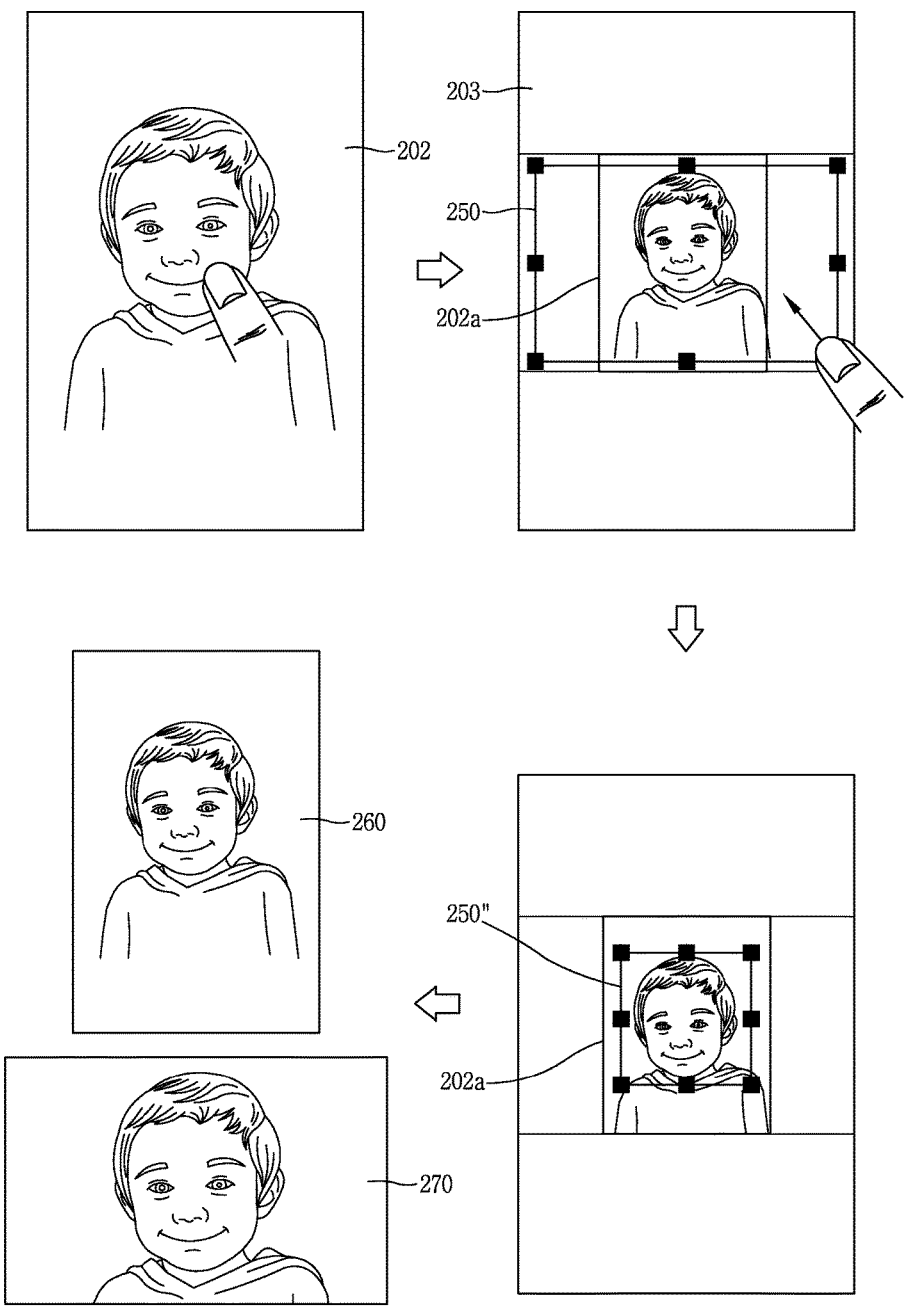

Such example is illustrated in FIG. 3D. Referring to FIG. 3D, when a preset touch input (e.g., a long touch input) is applied to a preview screen 202 corresponding to an actual capture direction (e.g., a vertical direction), the controller 180 may switch the preview screen 202 into a second preview screen 203 corresponding to a direction (e.g., a horizontal direction) different from the actual capture direction.

Here, the second preview screen 203 is a preview screen which is output on the display unit 151 when the mobile terminal 100 is gripped in the horizontal direction. That is, while the user still grips the mobile terminal 100 in the vertical direction, only the preview screen is switched into the second preview screen 203 which is the screen corresponding to the horizontal direction. In this instance, although not illustrated, an indicator indicating that the preview screen has been switched in spite of an output direction of the mobile terminal may be output on a screen.

Also, a first guide object 202a indicating an area corresponding to the preview screen 202 to be actually captured may be output on the second preview screen 203.

Also, a second guide object 250, which allows the user to adjust a layout, a zoom-in/out, and a ratio of the zoom-in/out of an image to be captured in a direction (e.g., the horizontal direction) different from the actual capture direction or a rotation and a rotation angle of the image, may be output on a frame of the second preview screen 203.

The user can drag the second guide object 250 up, down, to left or to right, or pinch in/out the second guide object 250, to decide a frame of the image, which is to be captured in the direction (e.g., the horizontal direction) different from the actual capture direction.

For example, referring to FIG. 3D, as a touch input applied to a point object output on the second guide object 250 is dragged toward a center of the second preview screen 203, the second guide object 250 is scaled down into a second guide object 250", and an image 270 to be captured in the horizontal direction is changed based on the second guide object 250".

That is, the image 270 in the horizontal direction to which the zoom-in function has been applied can be acquired along with an image 260 in the vertical direction corresponding to the actual capture direction.

Although not illustrated, the foregoing embodiments may also be applied to a case of performing panoramic capturing through the camera 121a including the plurality of lenses disclosed herein. For example, while performing the panoramic capturing with slightly moving the mobile terminal 100 in a left or right direction, when taps are applied to the display unit 151, the controller 180 may simultaneously capture images having capture directions different from an actual capture direction at the taps-applied time points, and add the captured images to a panoramic image.

Also, the controller 180 may output on a preview screen guide information for inducing a user input (e.g., a tap on a screen) for performing capturing in a different capture direction (e.g., a vertical direction) at a time point when a main subject is expected to be cut off during the panoramic capturing. And, upon outputting a panoramic image later, a portion where the main subject is cut off may automatically be replaced with an image captured in a different direction.

FIGS. 4A, 4B, 5A, 5B, 6A to 6E, 7, 8, 9A, 9B, 10A, 10B, 100, 11A, 11B, 12, 13A and 13B illustrate various embodiments of the step (S40) of displaying at least one of dual-captured images stored, on the basis of each capture direction.

The plurality of images which are obtained by capturing the same subject in different directions and then stored, for example, may be output on the display unit 151 by executing a gallery application installed on the mobile terminal 100.

Figure 4A:
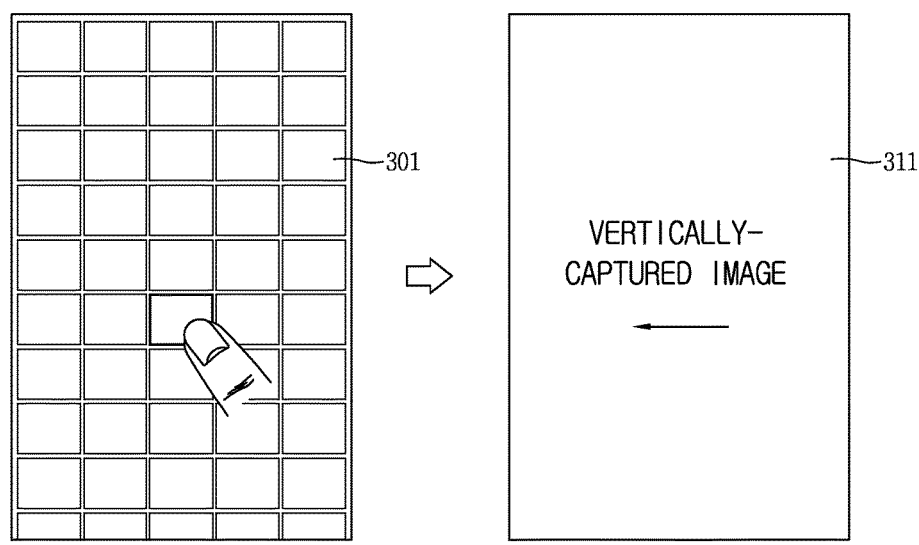
FIGS. 4A to 4C are conceptual views illustrating a method of differently arranging dual-captured images based on an output direction of a display unit in the mobile terminal in accordance with the present invention.
Figure 4B:
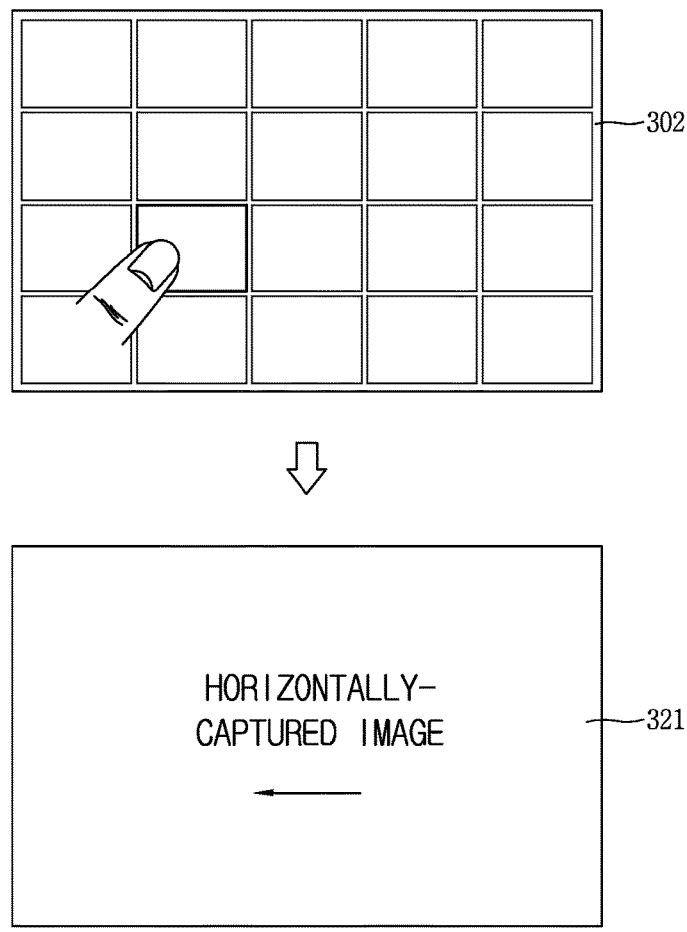
Figure 4C:
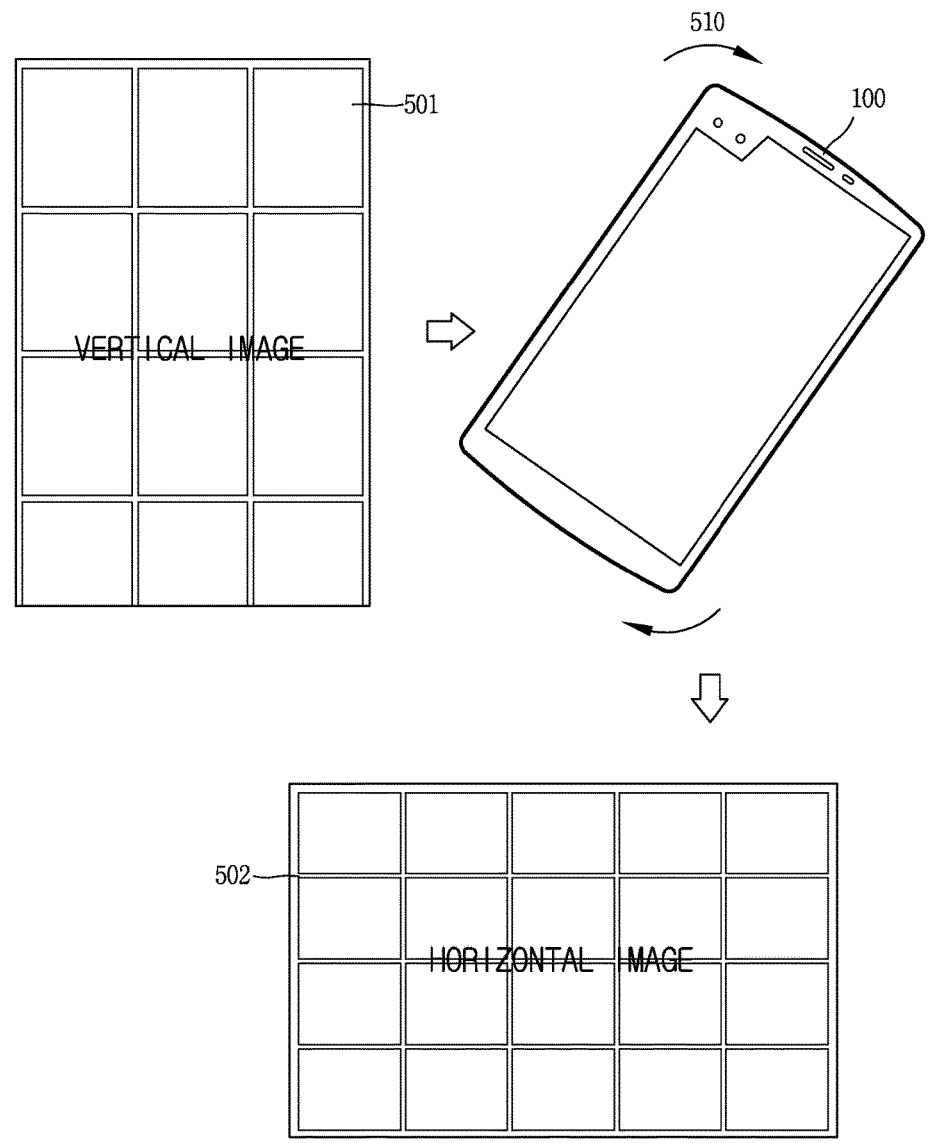

FIGS. 4A to 4C are conceptual views illustrating a method of displaying images simultaneously captured in different directions in different manners, on the basis of an output direction of the mobile terminal.

To this end, the sensing unit 140, for example, a gyro sensor and/or an acceleration sensor of the mobile terminal 100 may sense an output direction of information output on the display unit 151, and transfer the sensed output direction to the controller 180. The controller 180 may thus recognize the sensed output direction.

Accordingly, the controller 180 may selectively output one of dual-captured first and second images on the basis of the sensed output direction.

For example, as illustrated in FIG. 4A, when the output direction of the display unit 151 is a vertical direction, the controller 180 may display a thumbnail list 301 which includes only images captured in the vertical direction. In this instance, when a touch input is applied to one of the thumbnail images of the thumbnail list 301, the corresponding image 311 captured in the vertical direction may be fully output on the display unit 151. And, images which are output in response to a flicking touch input applied in the left or right direction may also be limited as the images captured in the vertical direction. That is, only the images captured in the vertical direction are browsed.

Similar to this, as illustrated in FIG. 4B, when the output direction of the display unit 151 is a horizontal direction, the controller 180 may output a thumbnail list 302 which includes only images captured in the horizontal direction. And, images which are output in response to a flicking touch input applied to one selected image 321 in a left or right direction may also be limited as the images captured in the horizontal direction. That is, only the images captured in the horizontal direction are browsed.

Meanwhile, when it is sensed that the current output direction of the display unit 151 is changed in response to a rotation of the main body of the mobile terminal 100, the controller 180 may change a thumbnail list to include images having a capture direction corresponding to the changed output direction, and a browsing manner.

For example, as illustrated in FIG. 4C, when it is sensed that the output direction of the display unit 151 of the mobile terminal 100 is changed from the vertical direction into the horizontal direction, a first thumbnail list 501 including images captured in the vertical direction is switched into a second thumbnail list 502 including images captured in the horizontal direction.

In this instance, although not illustrated, a notification icon notifying the changed style of the thumbnail list may be popped up on the display unit 151 and then disappear.

Also, an animation effect that the thumbnail images of the vertically-captured images included in the first thumbnail list 501 are changed into thumbnail images of the horizontally-captured images, may be output while the vertically-captured images are rotated in response to a rotary motion 510 of the mobile terminal 100. Or, when there are images captured in a diagonal direction, thumbnail images of the diagonally-captured images may appear and then be switched into the horizontally-captured images, in response to the rotary motion 510 of the mobile terminal 100.

Also, although not illustrated, in a state that a specific image captured in the vertical direction is fully output on the display unit 151 in response to a selection of one thumbnail image from the first thumbnail list 501 including the images captured in the vertical direction in FIG. 4C, when the output direction of the display unit 151 is switched into the horizontal direction, the specific image may be directly changed into an image of a version captured in a different direction, namely, a horizontally-captured image.

Meanwhile, when it is set that the output direction of the display unit 151 is not changed in spite of the rotation of the terminal, the first thumbnail list 501 or the second thumbnail list 502 may continuously be output even though the mobile terminal 100 is rotated.

Figure 5A:
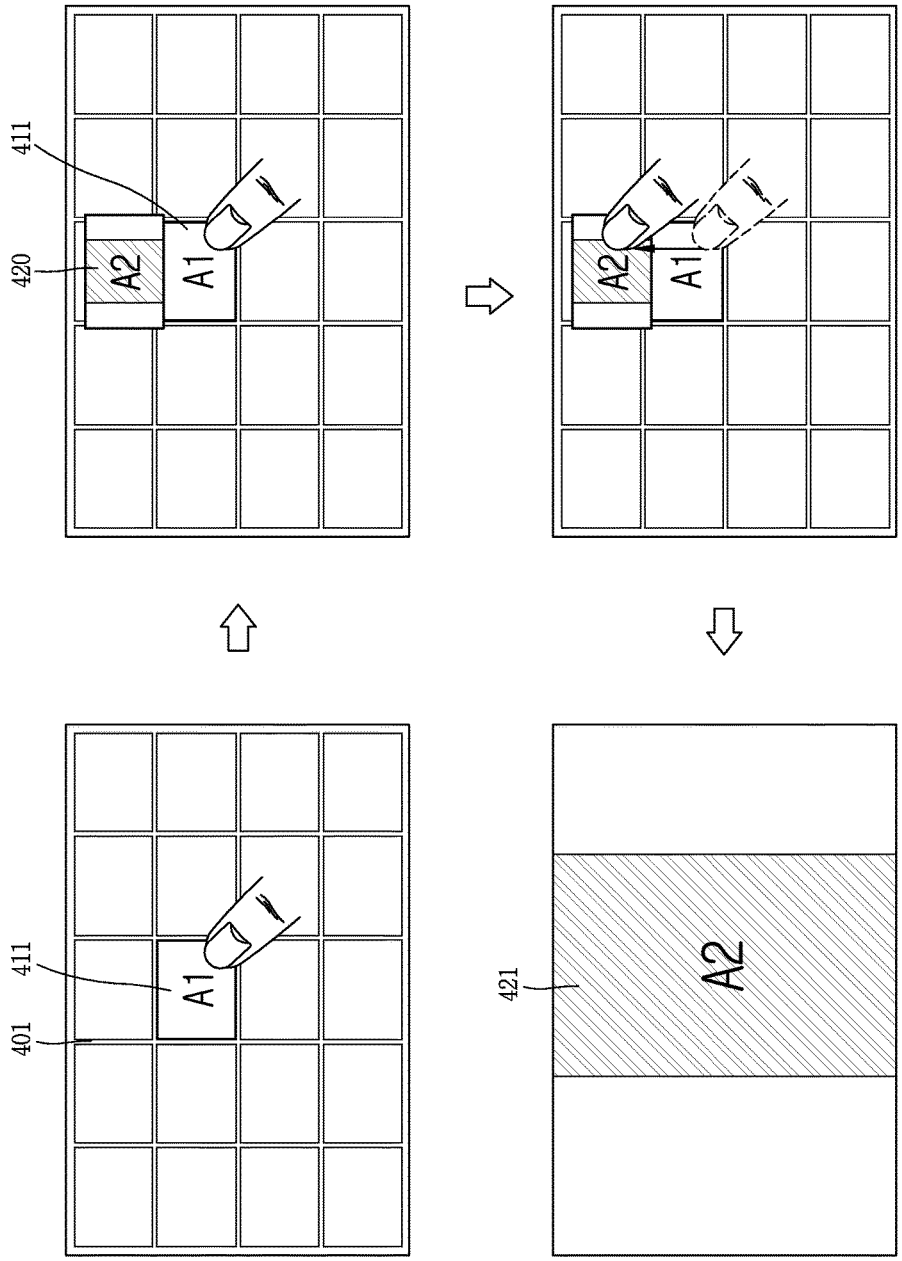
FIGS. 5A and 5B are conceptual views illustrating a method of checking versions in different capture directions of a currently-displayed specific image, in the mobile terminal in accordance with the present invention.
Figure 5B:
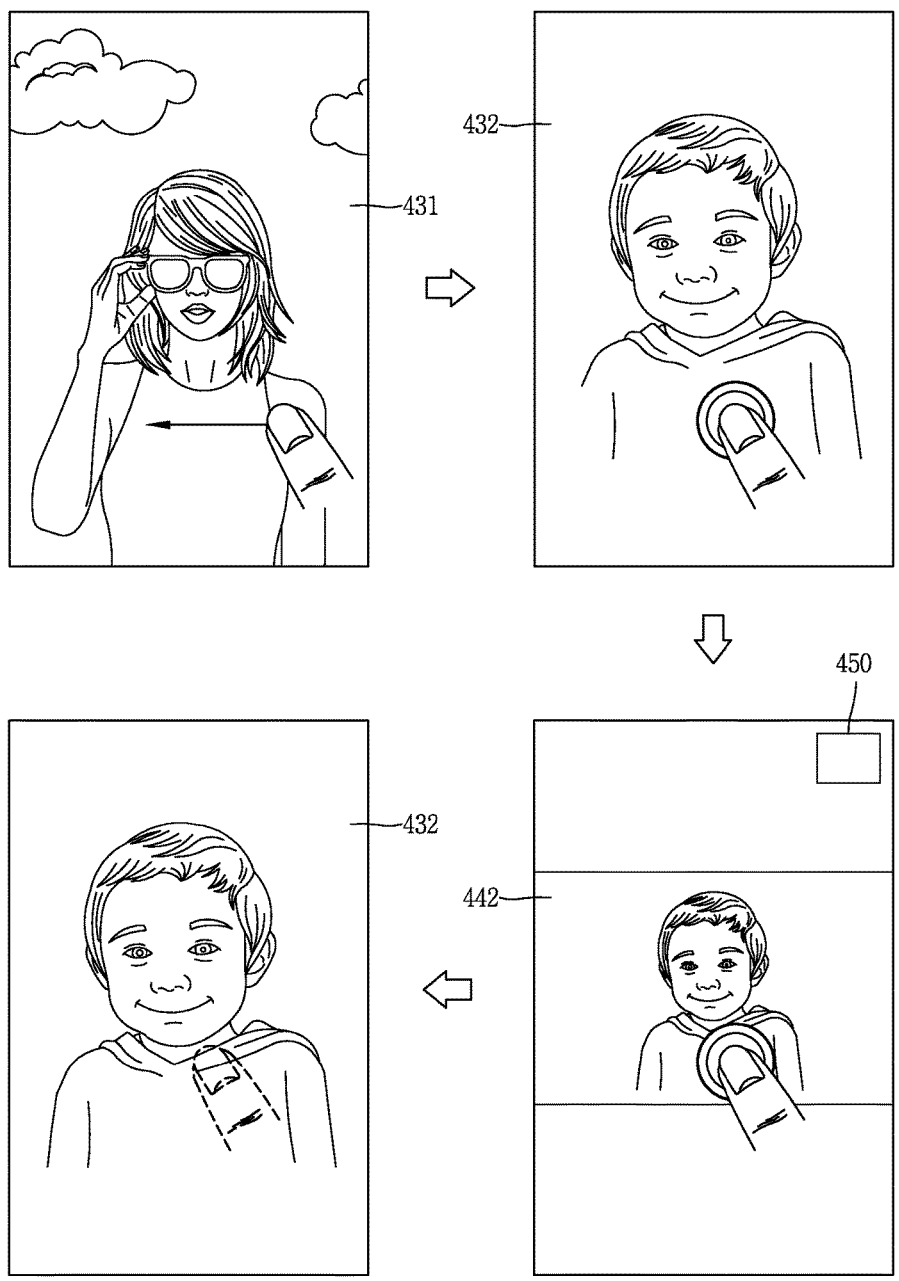

Next, FIGS. 5A and 5B illustrate embodiments of a method of checking (viewing) a specific image having a different capture direction from a currently-output image, without the aforementioned change of the output direction.

First, FIG. 5A illustrates an embodiment of viewing a specific image captured in a different direction in a thumbnail list including a plurality of images.

Referring to FIG. 5A, it is assumed that the thumbnail list 401 includes images captured in a direction corresponding to an actual capture direction. That is, in this instance, since the thumbnail list 401 includes the images corresponding to the actual capture direction, irrespective of the output direction of the display unit 151, the thumbnail list 401 may include both images captured in a vertical direction and images captured in a horizontal direction. Here, at least one image having a different capture direction from the actual capture direction may be hidden without being displayed. On the other hand, other dual-captured images may be present and each image output on the list 401 may be referred to as 'representative image.'

When a preset touch gesture (e.g., a long touch input) is applied to a specific thumbnail image 411 ('A1') of the thumbnail list 401, a popup window 420 may be generated adjacent to the specific thumbnail image 411 ('A1') to which the touch gesture has been applied. The generated popup window 420 may include a hidden image ('A2') having a different capture direction from the specific thumbnail image ('A1'). Meanwhile, a frame of the selected specific thumbnail image 411 ('A1') may be highlighted while the preset touch gesture is maintained.

In one exemplary embodiment, another image associated with the representative image ('A1') or another image associated with the hidden image ('A2') may be output on the popup window 420 along with the hidden image ('A2') in a slideshow manner. Here, the image associated with the representative image ('A1') or the hidden image ('A2') may refer to images edited based on the corresponding image.

Meanwhile, in the output state of the popup window 420, the controller 180 may perform a different operation according to a dragged path or a released position of the preset touch gesture.

In detail, when a preset touch gesture is released after being dragged into the popup window 420, the controller 180 may output an image, which has been output on the popup window 420 at a released time point of the preset touch gesture, on the entire display unit 151. For example, in the output state of the hidden image ('A2') on the popup window 420 in FIG. 5A, when the touch gesture applied to the representative image ('A1') is released within the popup window 420, the controller 180 may determine that the hidden image ('A2') has been selected, and then output the hidden image 421 ('A2') on the entire display unit 151.

Meanwhile, when the preset touch gesture is released directly on the representative image ('A1') without being dragged into the popup window 420, both the popup window 420 and the highlighting effect output on the frame of the representative image) 'A1') may disappear.

Also, when the preset touch gesture which has been dragged into the popup window 420 is released within the corresponding representative image, the corresponding representative image may be switched into an image output on the popup window at the released time point of the touch gesture. Accordingly, the thumbnail image 'A2' is output on the thumbnail list 401 and the another image 'A1' is hidden. In this instance, guide information notifying the change in the specific representative image may be popped up on a screen and then disappear.

FIG. 5B illustrates an embodiment of viewing an image having a different capture direction from a specific image while the specific image is displayed.

Referring to FIG. 5B, in a state that a specific image 431 is output on the display unit 151, when a flicking touch input is applied in a left or right direction, a previous/subsequent representative image 432 is displayed.

In this instance, in case of desiring to temporarily check an image captured in a different direction with respect to the output image 432, when a preset touch input (e.g., long touch input) is applied to the displayed image 432, a screen is switched into an image 442 which is a version of a different capture direction corresponding to the image 432.

In this instance, an icon 450 including information related to the capture direction of the switched image 442 may be output on one area of the display unit 151. Here, a shape of the icon may be an image indicating the capture direction (e.g., horizontal direction) of the switched image 442. In this state, when the touch input applied to the switched image 442 is released, the screen is switched back into the previously-output image 432. Accordingly, the user who is browsing representative images can easily check a version of a different capture direction with respect to a specific image and easily come back to a version of a previous capture direction of the specific image.

Meanwhile, when there are a plurality of images having a version of a different capture direction, for example, when images captured in a diagonal direction are included, those images may be output on a screen in an alternating manner while a touch input applied to the image 432 is maintained.

Next, FIGS. 6A to 6D are views illustrating methods of changing an arrangement of a list of images displayed based on capture directions into a different style, in response to various user inputs, in the mobile terminal disclosed herein.

In detail, when a preset gesture input is sensed while a first image having a first capture direction is output on the display unit 151, the controller 180 of the mobile terminal 100 may switch the displayed first image into a second image having a second capture direction or display the first image by adding the second image thereto. In this instance, when the second image is added, the first image may be resized and thus both of the first image and the second image can simultaneously be output on one screen.

Or, when a preset gesture input is sensed while a thumbnail list including images having the first capture direction is output, the controller 180 may change the displayed thumbnail list into another list including images having the second capture direction or change an arrangement of the thumbnail list to include both of the images having the first and second capture directions.

Here, the preset gesture input may include every type of input which the user applies, desiring to change a view style of dual-captured images.

Figure 6A:
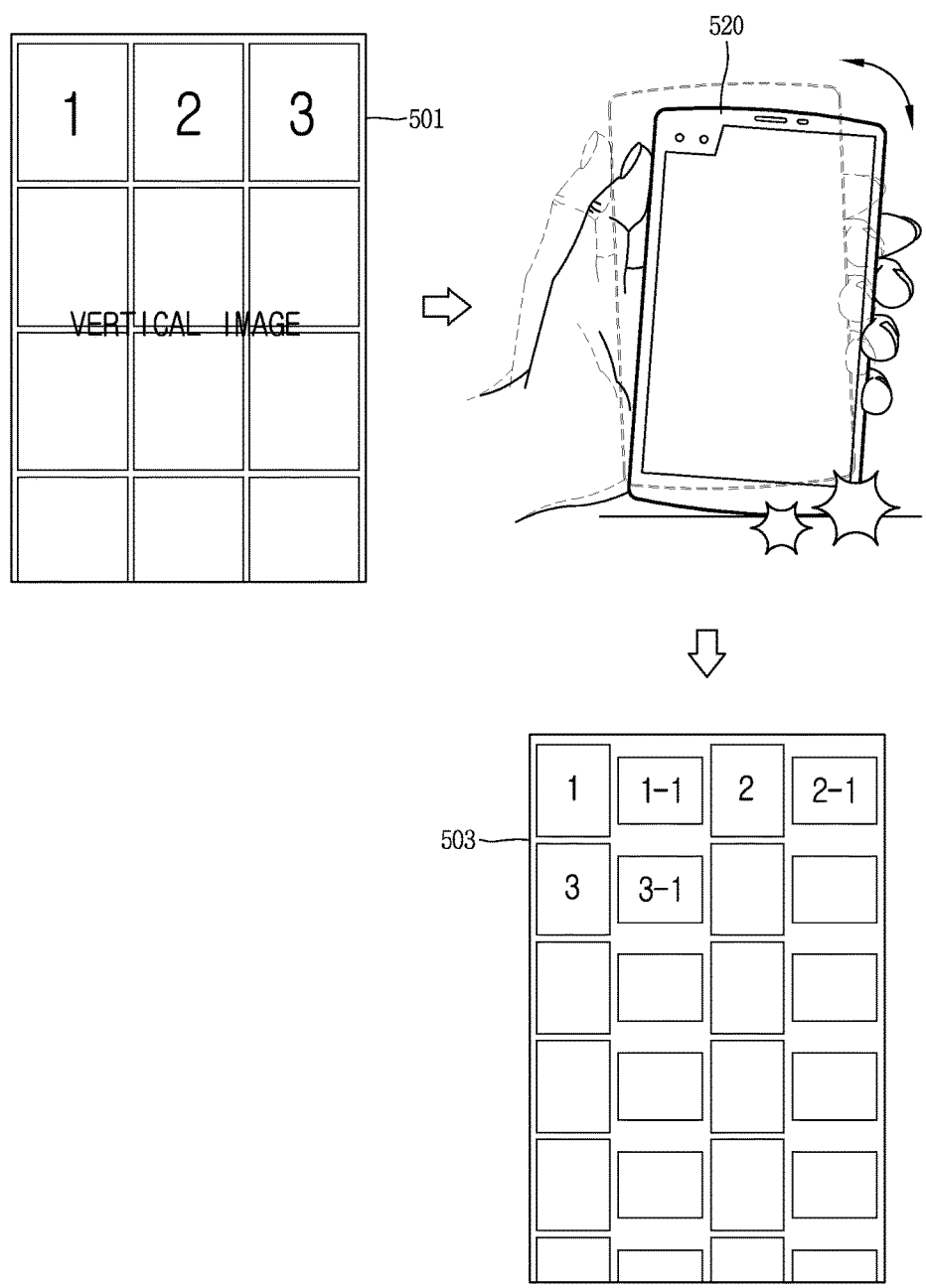
FIGS. 6A to 6D are exemplary views illustrating a method of changing an arrangement of images included in a list, arranged based on capture directions, into a different arrangement, on the basis of a user input, in the mobile terminal in accordance with the present invention.

For example, as illustrated in FIG. 6A, in a state that a list 501 including only images captured in a vertical direction is output as an output direction of the display unit 151 of the terminal is settled in the vertical direction, upon an input of a gesture of tapping a floor (ground) or an object with the terminal by a predetermined number of times, like arranging edges of papers using the floor, images captured in a horizontal direction may additionally be output on the list 501. That is, a view style of the list 501 may differently change.

As a result, as illustrated in FIG. 6A, the images may be arranged in the changed list 503 in a manner that images of a vertical (or horizontal) version and images of a horizontal (or vertical) version are alternately displayed.

In this instance, different shapes of thumbnail images may be displayed on the changed list 503 according to each capture direction such that the user can intuitively distinguish the images captured in the horizontal direction and the images captured in the vertical direction.

For example, thumbnail images 1-1, 2-1 and 3-1 of the images captured in the horizontal direction may be output in a rectangular shape that extends long in the horizontal direction, and thumbnail images 1, 2, and 3 of the images captured in the vertical direction may be output in a rectangular shape that extends long in the vertical direction.

Under this state, when the gesture of tapping the floor or object with the terminal by the predetermined number of times is input again, the view style of the changed list 503 may be changed one more time. For example, only the images captured in the horizontal direction may be left on the list 503 without the images captured in the vertical direction.

Figure 6B:
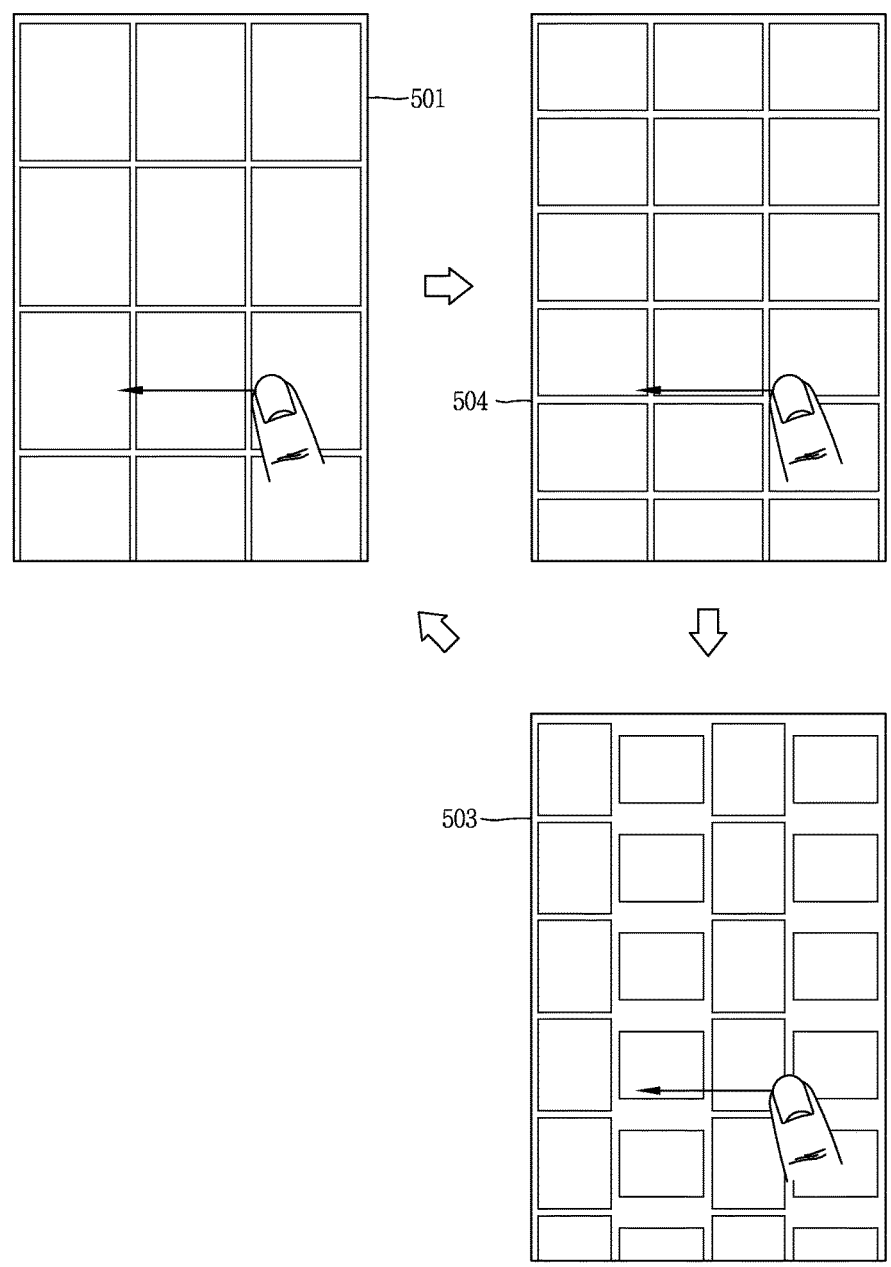

As another example, referring to FIG. 6B, in a state that a list 501 including images captured in a first direction (e.g., vertical direction) is output on the display unit 151, when a drag touch input/flicking touch input is applied in a horizontal direction, a view style of the list 501 may be changed into a second list 504 including images captured in a second direction (e.g., horizontal direction).

In this instance, when the drag touch input/flicking touch input is subsequently applied to the second list 504 in the horizontal direction, a third list 503 including all of the images captured in the first direction and the second direction may be output. Here, when the drag touch input/flicking touch input in the horizontal direction are continuously applied, the list 501 having the initially-displayed view style may be output again.

Figure 6C:
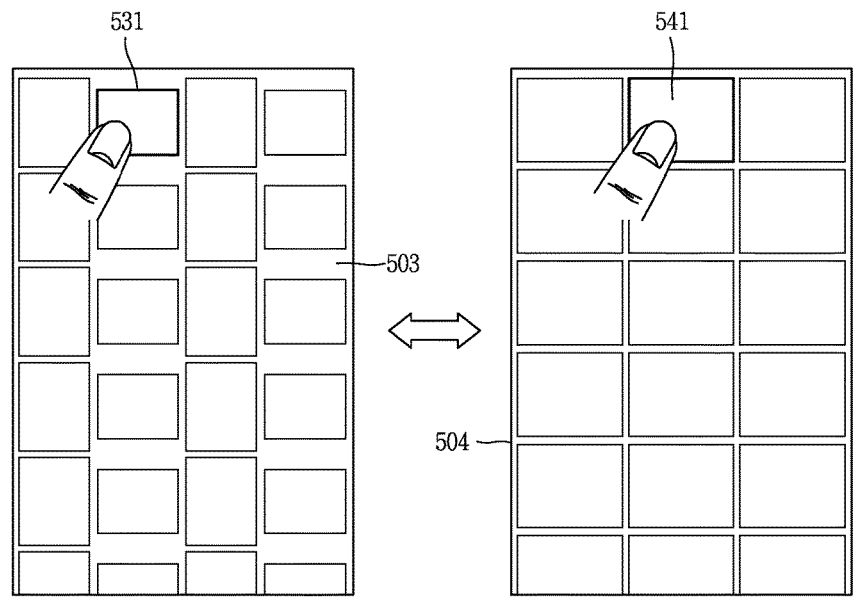
Figure 6D:
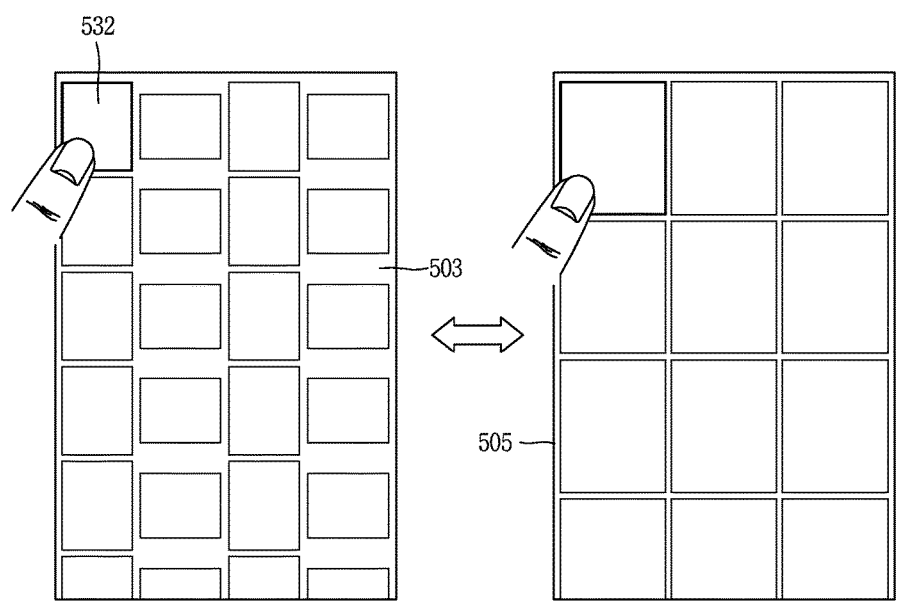

As another example, referring to FIGS. 6C and 6D, in a state that the list 503 including every dual-captured image is output on the display unit 151, when a long touch input is applied to a thumbnail image 531 having a first shape (e.g., a rectangular shape extending long in the horizontal direction), captured in the horizontal direction, the arrangement of the list 503 may be changed to include only the thumbnail images having the same shape as the first shape (504).

When the long touch input is applied again to an arbitrary thumbnail image 541 of the changed list 504, the view style of the changed list 504 may be restored to its previous view style (503). This is similarly applied, as illustrated in FIG. 6D, even to a case where the long touch input is applied to a thumbnail image 532 having a second shape (e.g., a rectangular shape extending long in the vertical direction), captured in the vertical direction.

In this manner, for displaying a plurality of dual-captured images, a view style of a list can be changed in an easy and fast manner on the basis of capture directions. Also, even when images captured in different directions are displayed together, the user can intuitively identify corresponding capture directions.

Figure 7:
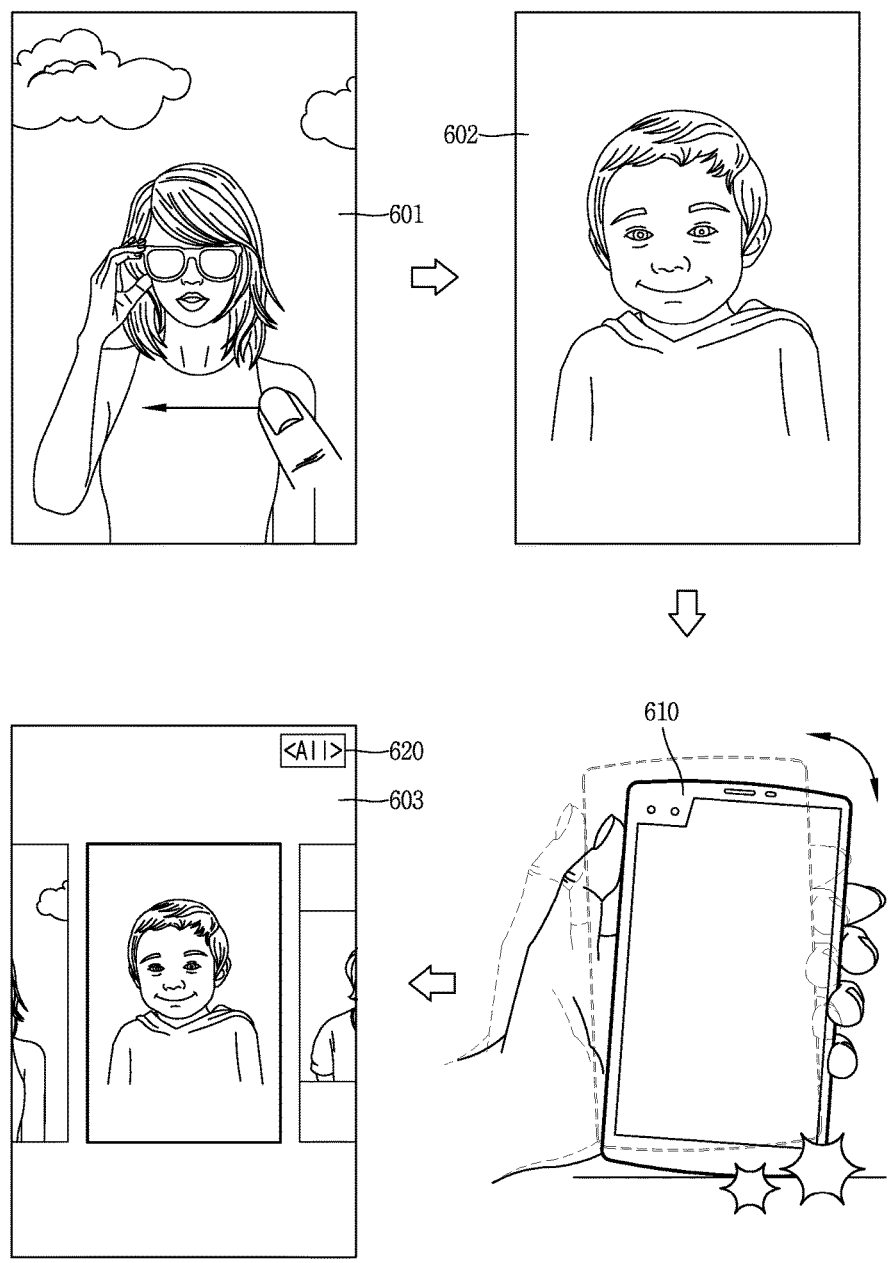
FIG. 7 is a view illustrating a method of displaying a version in a different capture direction of a specific image while outputting the specific image, in the mobile terminal in accordance with the present invention.

Next, FIG. 7 is a view illustrating a method of additionally displaying a hidden image of a version captured in a different direction, based on a user input, in a state that one image captured in a specific direction of a plurality of dual-captured images is output on the display unit 151.

As illustrated in FIG. 7, a previous/subsequent image 602 having the same capture direction as that of a specific image 601 may be displayed in the stored order, in response to the displayed specific image 601 being dragged in a left or right direction. In this instance, when a preset gesture, for example, a gesture of tapping a floor or an object (e.g., a user's palm) with the terminal by a predetermined number of times is input (610), images of versions captured in different directions from the currently-displayed image are also output (603). In this instance, with the appearance of the hidden images having the different capture directions on the display unit 151, a visual cue notifying that the view style has changed may be output for a predetermined time and then disappear.

In order for the user to intuitively recognize that images in every capture direction appear in response to a drag touch input/flicking touch input being applied in the horizontal direction, an icon 620 with 'All' may be output on one area of the display unit 151. In this instance, when a touch input is applied to the output icon 620, the controller 180 may change the view style into a different one (e.g., to display only images captured in the horizontal direction) and change an output of the icon 620 for the user to intuitively recognize capture directions of images corresponding to the changed view style.

Figure 8:
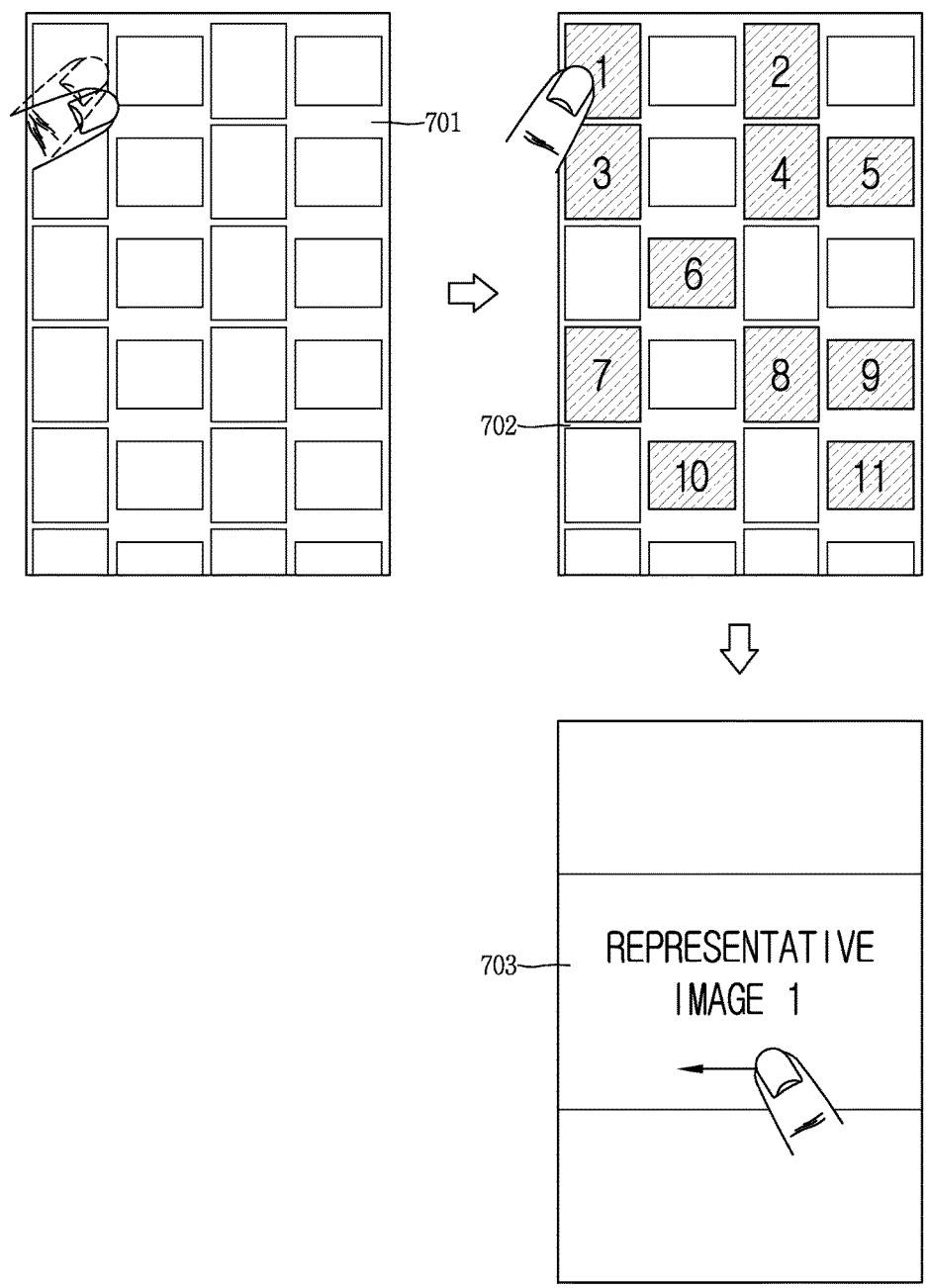
FIG. 8 is a conceptual view illustrating a method of outputting an image corresponding to an actual capture direction in a list including a plurality of dual-captured images, in the mobile terminal in accordance with the present invention.

FIG. 8 exemplarily illustrates a method of distinctively outputting images corresponding to an actual capture direction in a list including a plurality of images captured in all directions.

In the exemplary embodiment of FIG. 8, a illustrated list 701 includes images in all capture directions acquired through one capturing. That is, the list 701 may include even images captured in different directions from an actual capture direction, without hiding any of such images.

When a double touch input is applied to an arbitrary thumbnail image of the list 701, thumbnail images, namely, representative images 1 to 11 corresponding to the actual capture direction among the images included in the list 701 may selectively be output (e.g., in a highlighting manner) (702). The representative images 1 to 11, as illustrated, may be images captured in the horizontal direction or images captured in the vertical direction.

In this instance, the controller 180 may restrict an input of a control command with respect to thumbnail images which are not representative images, namely, images that have been simultaneously captured in different directions from the actual capture direction. In this manner, those thumbnail images are output on the list 701 but the input of the control command therefor may be restricted, which may allow only the representative images 1 to 11 to be checked in the form of a large image 703.

Meanwhile, in the state that the representative images 1 to 11 are output in the highlighting manner, when a double touch input is applied again to an arbitrary representative image 1 to 11, the highlighting effect may disappear and the restriction of the input of the control command with respect to specific images can be released. That is, the representative images are displayed in the form of the initial list 701.

Next, FIGS. 9A, 9B, 10A, 10B and 100 are conceptual views illustrating a method of fast accessing different associated images in a list, which includes only images having a specific capture direction or an actual capture direction, using a multi-touch input.

Here, the images having the specific capture direction may refer to images captured in a horizontal direction or images captured in a vertical direction, which is distinguished according to an output direction of the display unit 151. Or, the images having the specific capture direction may refer to images corresponding to an actual capture direction or images simultaneously captured in a different direction from the actual capture direction. Even in any case, another one image (or plural other images) which is simultaneously captured may not be output on the display unit 151.

Figure 9A:
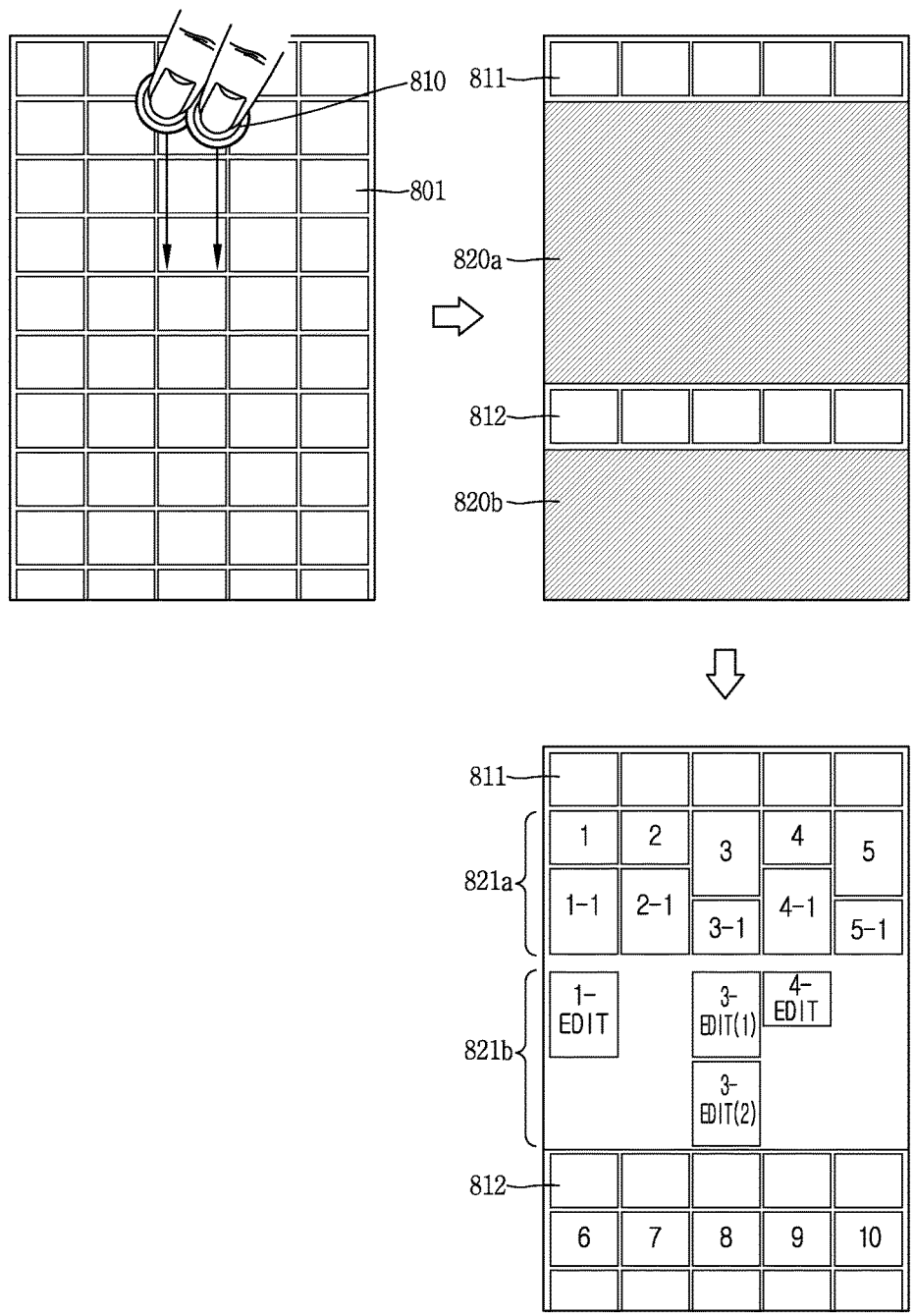
FIGS. 9A, 9B, 10A, 10B and 10C are conceptual views illustrating a method of fast accessing other associated images in a list including a plurality of dual-captured images using a touch gesture, in the mobile terminal in accordance with the present invention.

First, referring to FIG. 9A, in a state that a thumbnail list 801 which merely includes images having a first capture direction (e.g., a horizontal direction/vertical direction or an actual capture direction/different direction from the actual capture direction), when a two-finger touch input applied to a specific line (row or row line) of the thumbnail list 801 is dragged in a first direction (e.g., a downward direction based on the display unit 151), the controller 180 may control a screen in a manner that rows of the thumbnail list 801 are spaced apart from one another by predetermined gaps on the basis of the first direction. And, images having a second capture direction which are not displayed may appear on the spaced gap.

In detail, when a two-finger touch input applied to a second row of the illustrated list 801 is dragged down (810), the second row with the touch input applied thereto is moved down in the dragged direction, and an area 820a may be displayed as a first row 811 and a second row 812 are spaced apart from each other by a predetermined gap. In this instance, as illustrated, another area 820b may further be displayed at a spaced gap which is generated as the second row and a third row are also automatically spaced apart from each other.

In this instance, the controller 180 may control the screen in a manner that a size of an area appearing due to the spaced gap between the rows corresponds to the dragged length of the two-finger touch input. That is, the sizes of the areas 820a and 820b may increase in proportion to the dragged length.

Afterwards, images associated with the images of a row above the space 820a, for example, images 821a of versions captured in different directions or edited images 821b based on the versions may be output long in a row direction on the space 820a.

Accordingly, the user can check images associated with a specific row, namely, images of versions captured in all directions and their edited images at once while searching for stored images in a scrolling manner.

Although not illustrated, when a flicking touch input applied upwardly (or a one-finger touch input applied in an opposite direction to a direction of spacing lines from each other) is sensed in a state that one of the output thumbnail images is selected (touched), the controller 180 can change a row of images displayed on the list 810 into the selected thumbnail image, that is, can change the representative image of the list.

Figure 9B:
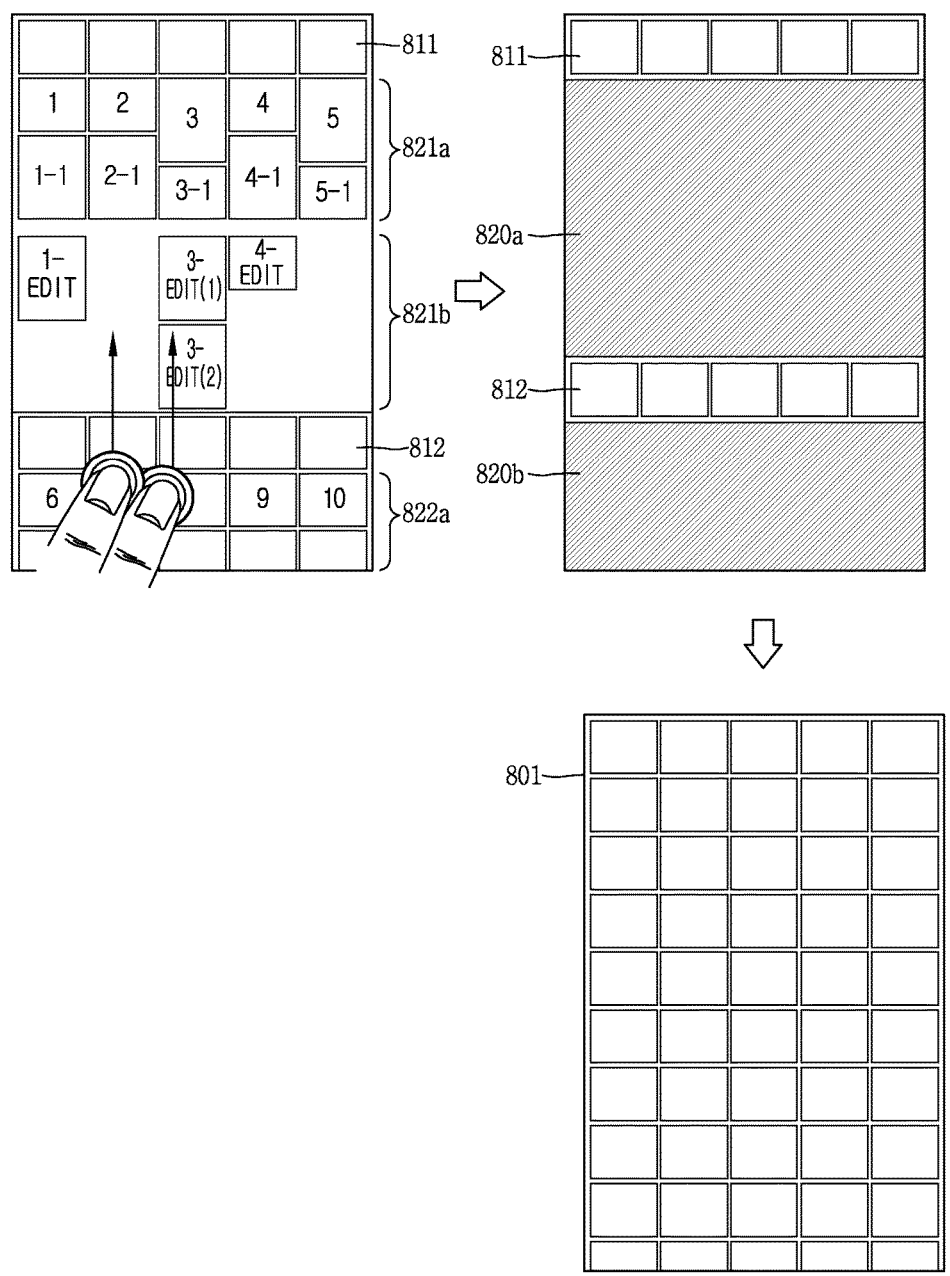

FIG. 9B illustrates a method of closing an open space by performing the processes performed in FIG. 9A in reverse order. FIG. 9B illustrates an embodiment in which the open spaces 820a and 820b are all closed in response to a two-finger touch input applied to a specific row being dragged upward, but the controller 180 may control the screen in a manner that only the space 822a corresponding to the specific line, to which the two-finger touch input has been applied, is closed.

Meanwhile, similar to FIGS. 9A and 9B, when a two-finger touch input is applied to a specific row of the list 801 and dragged, the row of the list 801 may be open along the dragged direction and thereby a space may be displayed.

Figure 10A:
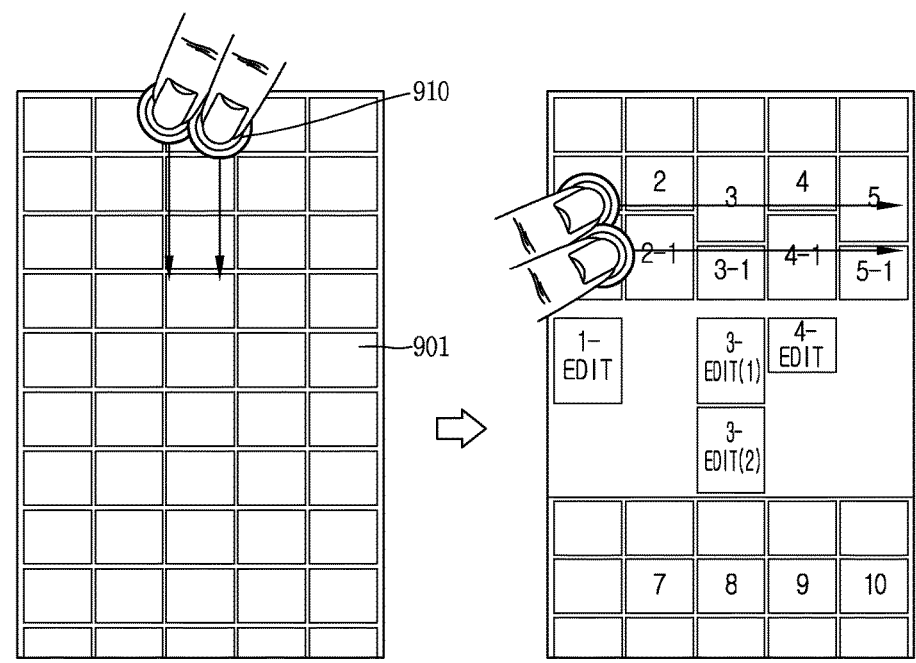
Figure 10A:
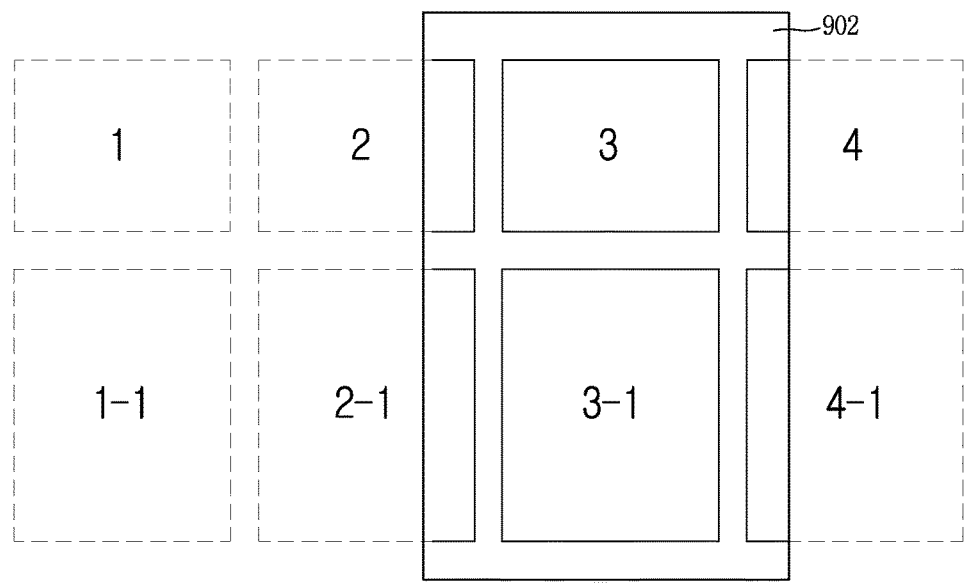

Also, when a drag touch input is consecutively applied in a horizontal direction within the space 820a which is open in response to dragging the two-finger touch input applied to the list 801, as illustrated in FIG. 10A, only images 1, 1-1, 2, 2-2, . . . , 5-1 which are images of versions of different capture directions with respect to the images of the corresponding row may be displayed according to an area to which the drag touch input 930 is applied, or as illustrated in FIG. 10O, images 1-edit 903, 3-edit(1), 3-edit(2), and 4-edit which have been edited based on the images of the corresponding row may merely be output on the screen.

Also, while the images 1, 1-1, 2, 2-2, . . . , 5-1 having the different capture directions from the images in the corresponding row are displayed on the screen, a message (e.g., "Please drag up if you want to view opposite images") indicating an input method for checking other dual-captured images, for example, may be output on a lower end of the display unit 151.

Figure 10B:
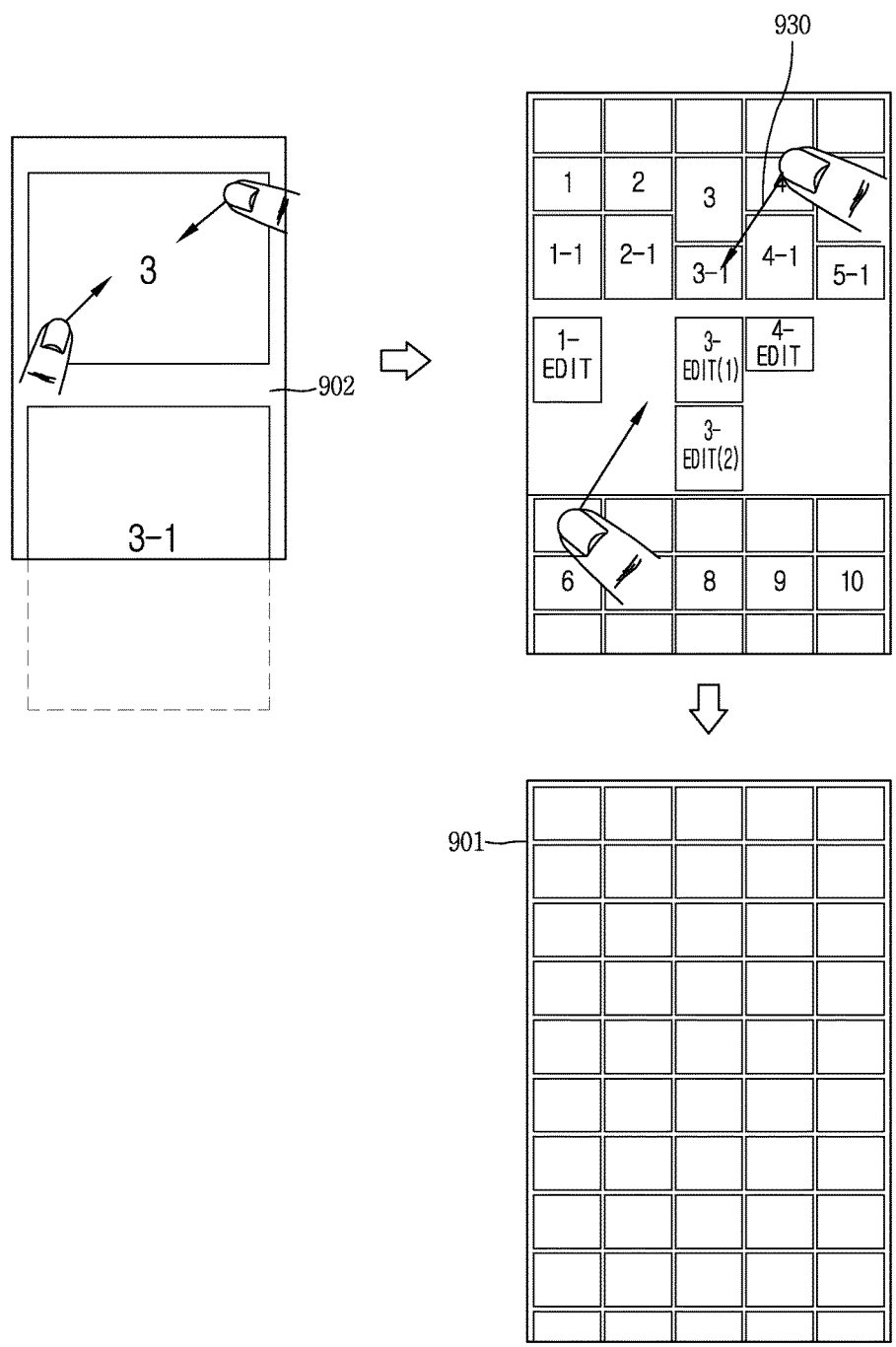
Figure 10C:
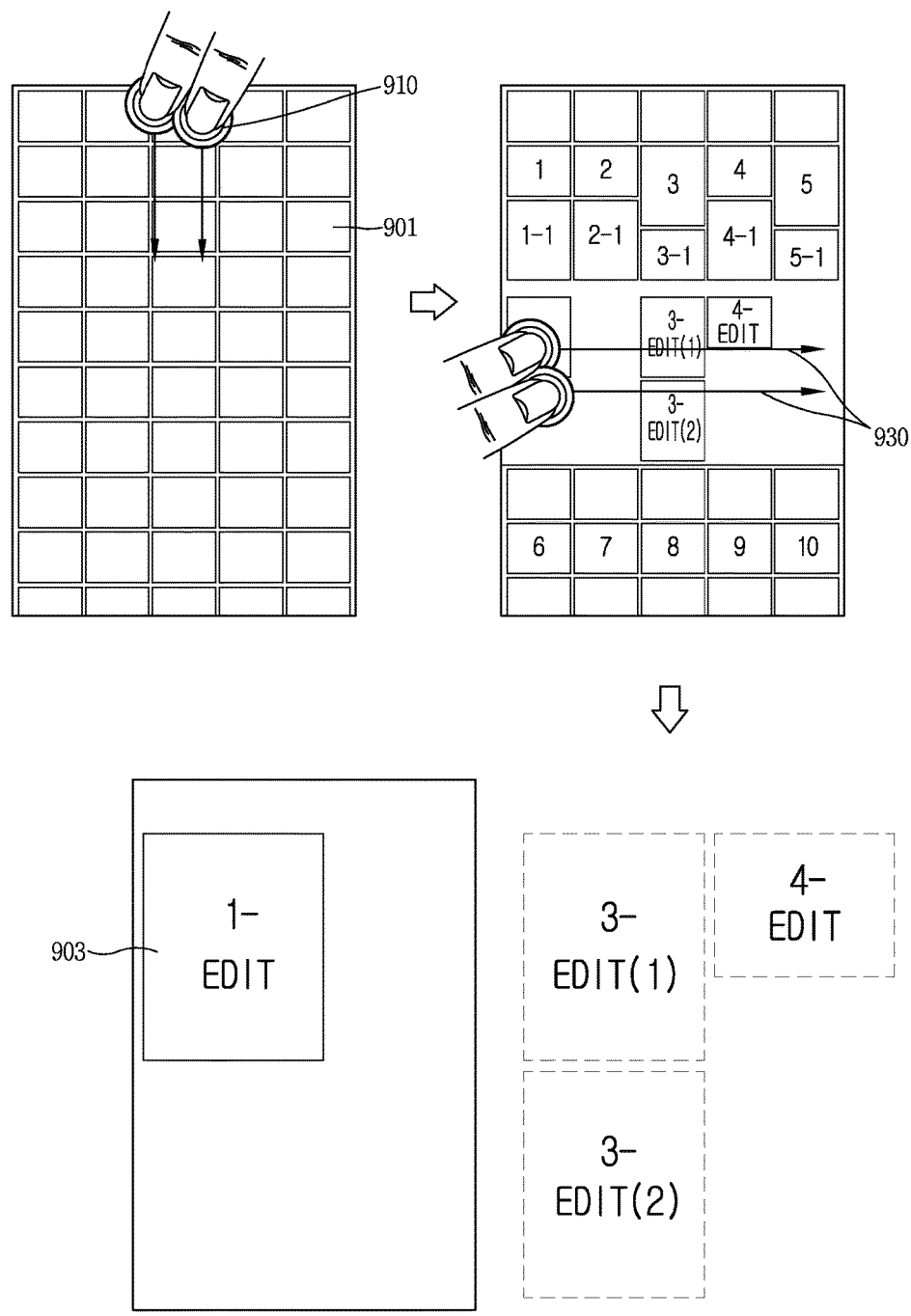

In the state (902) that the images 1, 1-1, 2, 2-1, . . . , 5-1 of versions captured in the different directions from the images of the corresponding row, as illustrated in FIG. 10B, when a pinch-in touch input is consecutively applied (930), the list with the open spaces and the initial list 901 may sequentially be displayed and the initial state is restored.

Figure 11A:
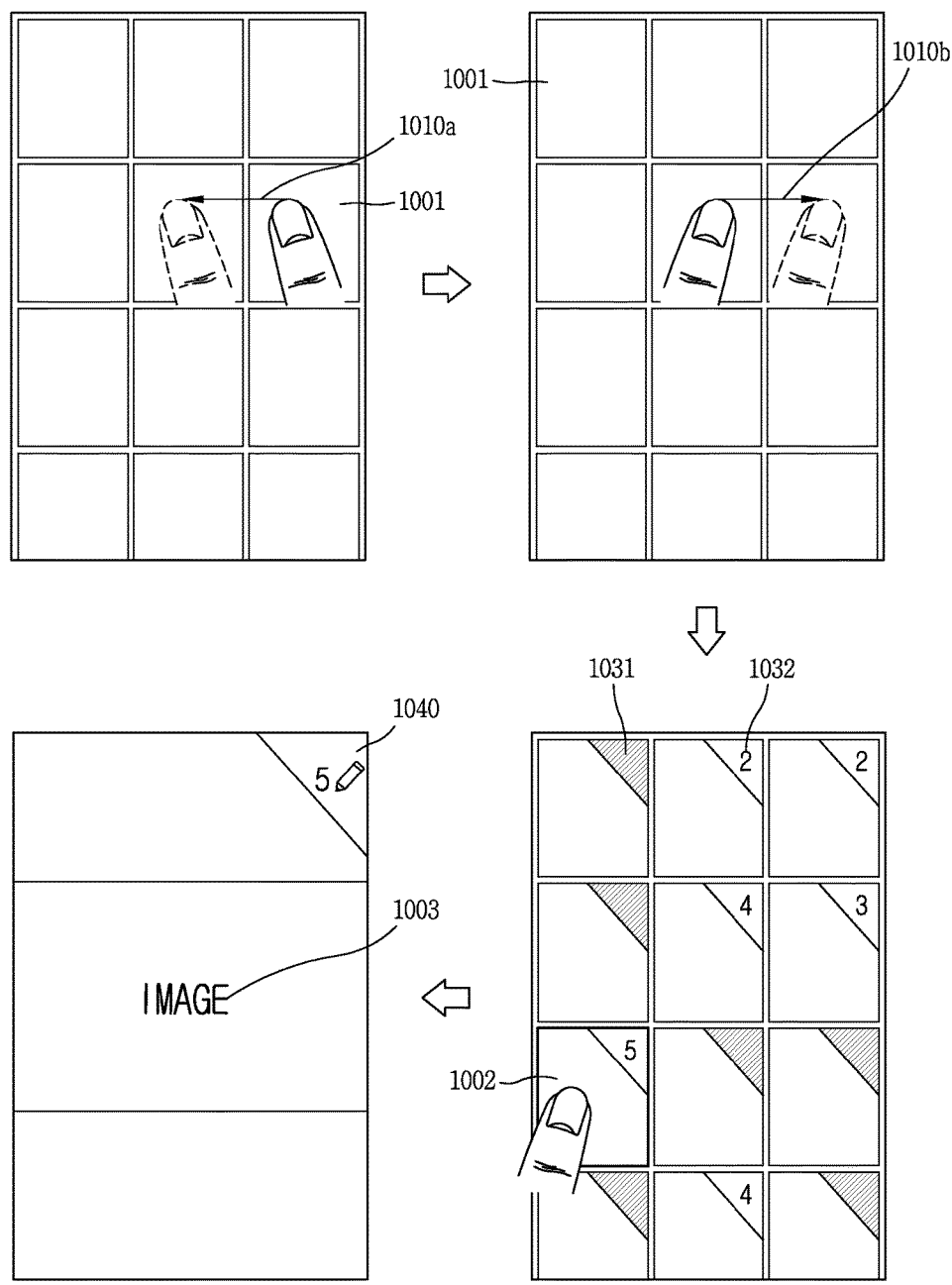
FIGS. 11A and 11B are views illustrating a method of outputting information related to associated images using a touch gesture, in the mobile terminal in accordance with the present invention.
Figure 11B:
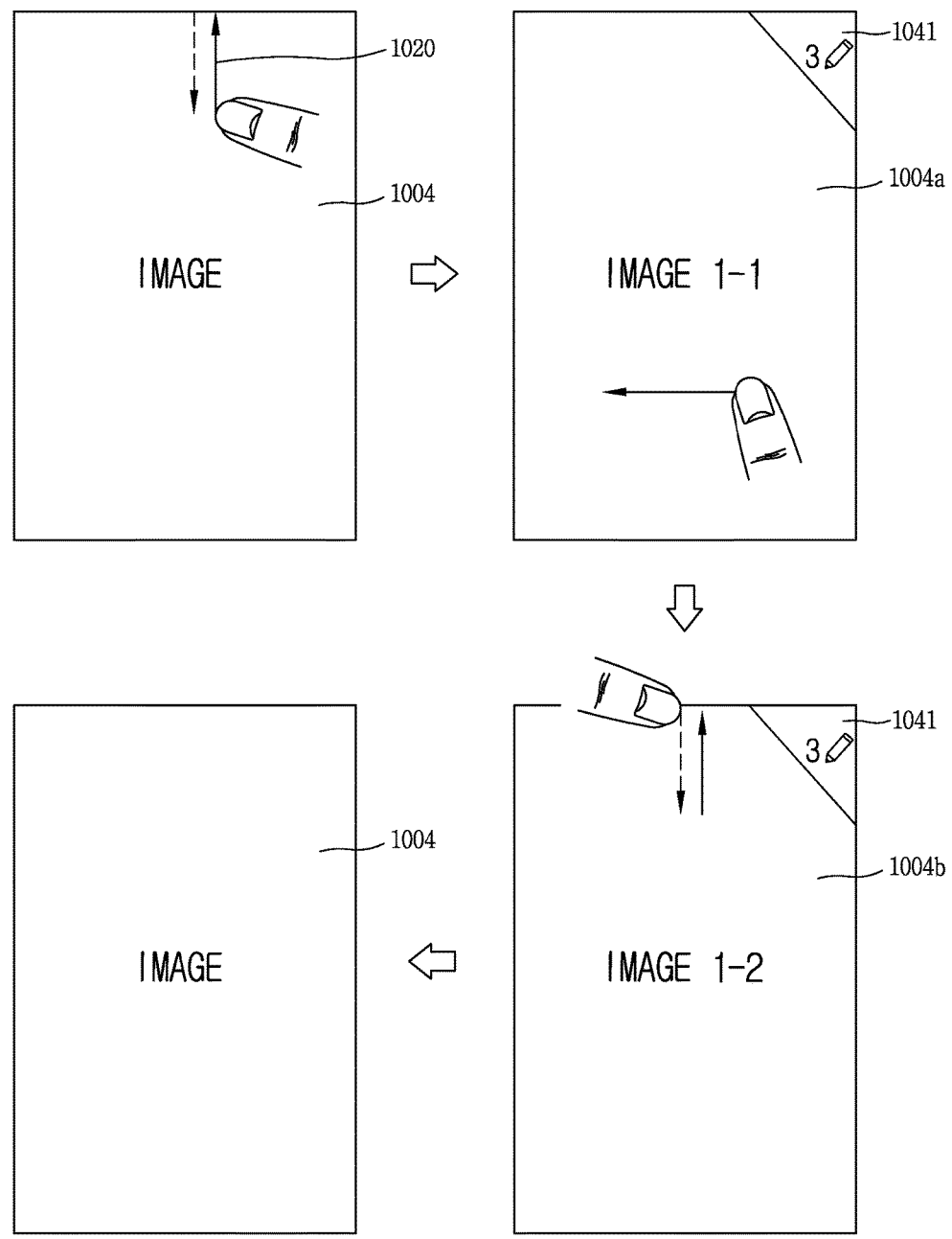

Hereinafter, FIGS. 11A and 11B illustrate embodiments of a case of checking only information related to images of versions captured in different directions, while maintaining a current view style.

FIG. 11A illustrates an embodiment of a method of outputting information related to other dual-captured images while a list including a plurality of images is displayed.

When a touch input applied to a first touch point on the list 1001 is dragged in a horizontal direction (1010a), and then continuously dragged back to the first touch point without being released (1010b), information related to other dual-captured images may be output on each thumbnail image within the list 1001. For example, as illustrated in FIG. 11A, while outputting an indicator like a corner of each thumbnail image is folded, information related to another dual-captured image may be provided on the corresponding area. For example, an existence or non-existence of other dual-captured images (1031, slashed), and at least one of a number of other dual-captured images and information related to a number of images edited based on the dual-captured images (1032, '2') may be provided.

Here, when a touch input is applied to an arbitrary thumbnail image 1002, the corresponding image 1003 may be output on the entire display unit 151 and simultaneously information related to other dual-captured images may also be output (1040). In this instance, when a touch input is applied to the information-output area (1040), the dual-captured images and images edited based on the dual-captured images can be checked with a large screen.

FIG. 11B illustrates an embodiment of outputting information related to other dual-captured images in a displayed state of a specific image.

When a touch input applied to a first touch point on the specific image 1004 (e.g., an upper end of the display unit 151) is dragged in a vertical direction and then dragged back to the first touch point without being released (1020), number information ('3') related to other dual-captured images may be output on one area 1041 of the specific image. And, when a flicking touch input is applied to the specific image in a left or right direction, associated images 1-1, 1-2, . . . corresponding to the output number information ('3') may be output in the stored order.

Although not illustrated, when a long touch input is applied to the area 1041 where the number information ('3') of the dual-captured images (or the number of images edited based on the dual-captured images) is output, the associated images 1-1, 1-2, . . . corresponding to the output number information ('3') can be edited (deleted, input text, transmitted, etc.) at once. To this end, when the long touch input is applied, a menu window for executing an associated edit function may be popped up on the display unit 151.

In this state, when a touch input which is dragged in a vertical direction and then comes back to an original touch point is applied to the displayed image 1004b (1-2), a previous view style may be restored and the initial image 1004 may be output again.

FIGS. 12A, 12B, 13A and 13B are conceptual views illustrating embodiments of a method of outputting associated images including dual-captured images using an auxiliary screen area when the display unit 151 is provided with the auxiliary screen area in the mobile terminal in accordance with the present invention.

Figure 12A:
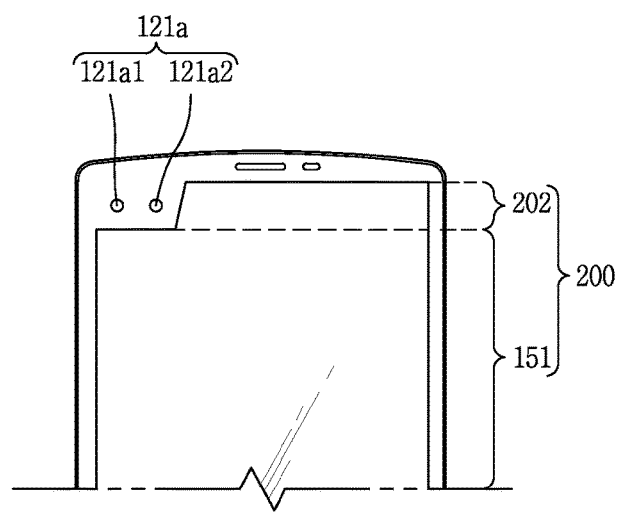
FIGS. 12A, 12B, 13A and 13B are conceptual views illustrating embodiments of a method of changing a display state of captured images using an auxiliary screen area of a terminal, in the mobile terminal in accordance with the present invention.

First, FIG. 12A illustrates a part of a display module 200 having an auxiliary screen area which extends from the display unit 151.

The display module 200 illustrated in FIG. 12A may have a structure divided into two areas arranged side by side in one direction. In this instance, a plurality of display areas 151 and 202 may be independently controllable, and if necessary, one of the two areas may selectively be activated so as to reduce power consumption.

For example, the first area 151 of the display module 200 may be used as a main screen for outputting general image information, and occupy most of a front surface of the mobile terminal 100. Also, the second area 202 of the display module 200 may be an auxiliary screen area for outputting status information regarding the mobile terminal 100 and the like, and arranged alongside at an upper side of the first area 151. Also, the front camera 121a having a plurality of lenses 121a1 and 121a2 for dual-capturing may be provided at a left side of the second area 202.

The first area 151 and the second area 202 may independently be activated and deactivated. For example, in a non-used state by the user, the first area 151 may be turned off and the second area 202 may always be turned on. Accordingly, even when the mobile terminal 100 is not used, a status of the terminal or basic information (e.g., weather, time, etc.) can be checked through the second area 202.

Also, FIG. 12A illustrates that the second area 202 is located at the upper end of the first area 151, but the present invention may not be limited to this. The second area 202 may be located at a lower end of the first area 151 or a structure in which the second area 202 is located at each of both upper and lower ends of the first area 151 may also be enabled. Hereinafter, the second area 202 may be referred to as 'auxiliary screen area' and the first area 151 may be referred to as 'main screen area.'

FIG. 4C illustrates that the plurality of dual-captured images are changed according to the output direction of the display unit 151 as the output direction of the display unit 151 is switched from a vertical direction (or horizontal direction) into a horizontal direction (or vertical direction).

Figure 12B:
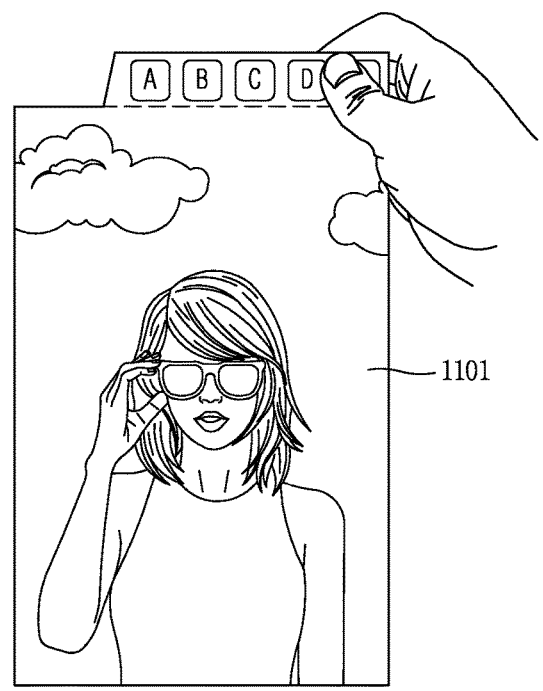
Figure 12B:
Figure 12B:
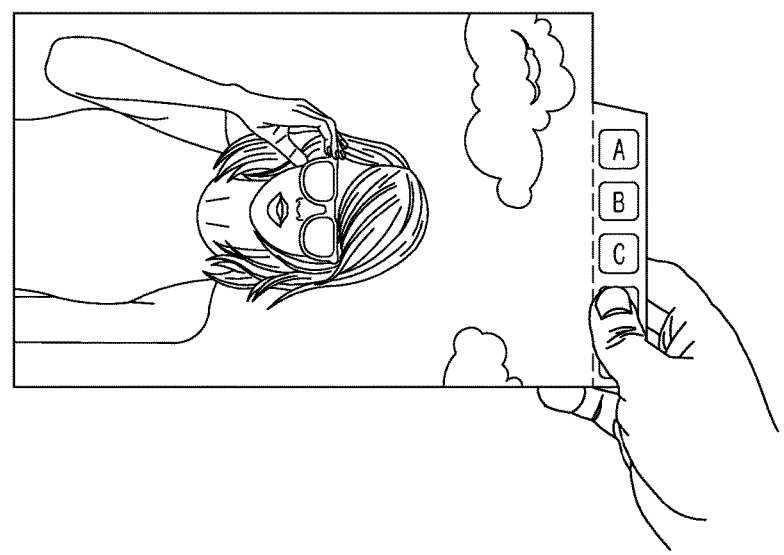

In relation to this, as illustrated in FIG. 12B, in a state that a touch input is applied to the auxiliary screen area, when the mobile terminal 100 is rotated from the vertical direction to the horizontal direction, the controller 180 may control a specific image, which has been output since before the rotation of the terminal, to be continuously output. For example, when the touch input applied to the auxiliary screen area is maintained while the terminal is rotated, an output state of an image 1101 captured in a vertical direction among dual-captured images may be maintained. In this instance, when the touch input applied to the auxiliary screen area is released, the image captured in the vertical direction may immediately be switched into another image captured in a horizontal direction.

Meanwhile, FIG. 12B illustrates the touch input applied to the auxiliary screen area, but the present invention may not be limited to this. The touch input may be applied to a lower end, an upper end or a side area of the display unit 151.

As another example, while an image captured in a specific direction is output on the main screen area, an image of a version captured in a different direction may be output in the form of a thumbnail image on the auxiliary screen area.

Figure 13A:
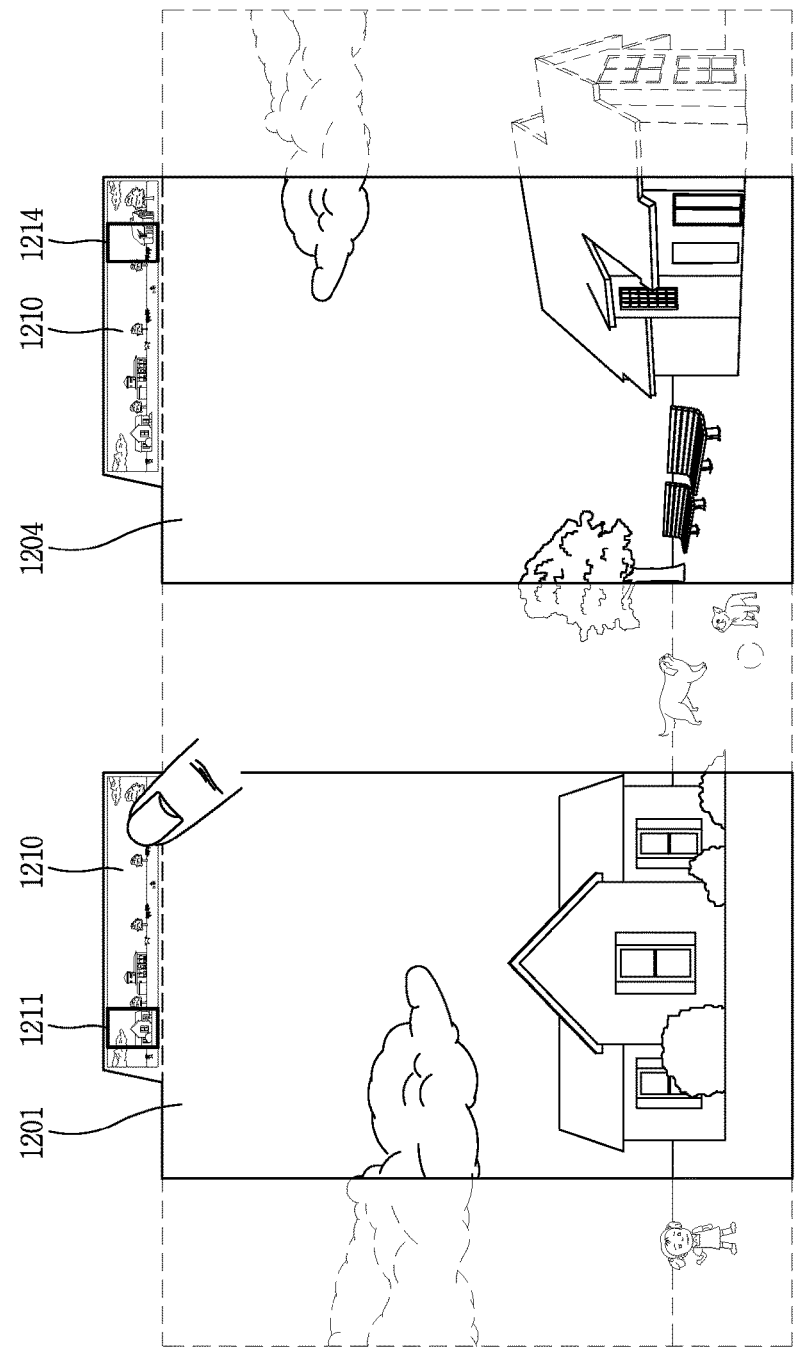

Next, FIG. 13A illustrates an embodiment of using the auxiliary screen area as a map area of stored images. To this end, it is assumed that a plurality of images some of which are dual-captured in different capture directions, captured by 360° or captured in a panoramic manner are stored in the memory 160 of the mobile terminal.

In this instance, thumbnail images of the associated plurality of images may be displayed on the auxiliary screen area in the form of a mini map. Here, one of images captured in different directions may automatically be selected based on a main subject and then displayed.

The displayed mini map 1210 may output thereon an object 1211 which indicates a position of an image 1201 currently displayed on the main screen area. In this instance, when a touch input is applied to a portion of the mini map 1210 to check an image corresponding to the portion in a large view, the controller 180 may control one of the dual-captured images corresponding to the touch input-applied portion to be displayed on the main screen area. And, an object 1214 notifying a position of a changed image 1204 may be output.

Figure 13B:
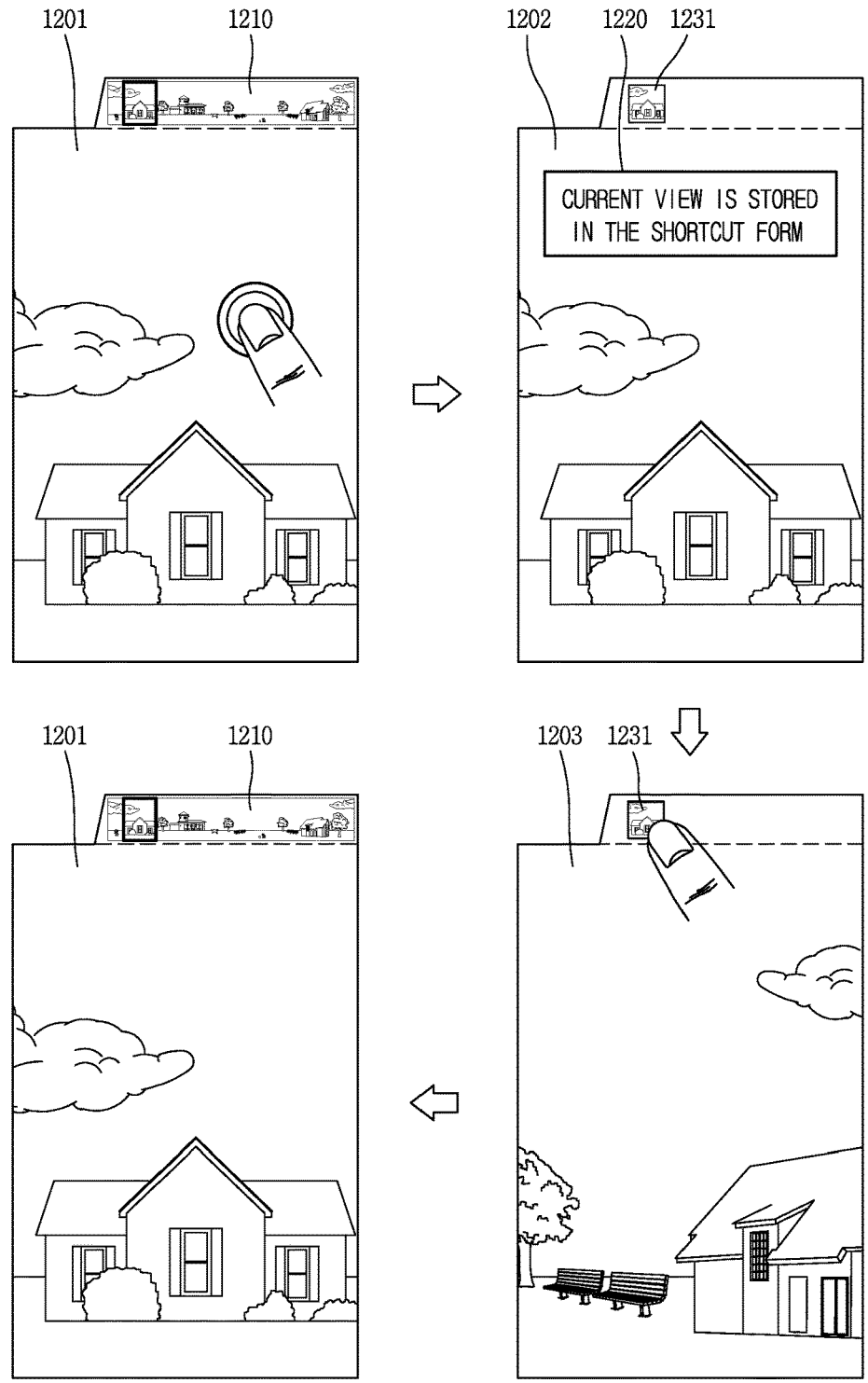

FIG. 13B illustrates an embodiment of setting a specific image into a shortcut form using the auxiliary screen area. As illustrated in FIG. 13B, in the state that the specific image 1201 is output on the main screen area and the mini map 1210 associated with the specific image 1201 is output on the auxiliary screen area, when a long touch input is applied to the output specific image 1201, the corresponding image may be stored in the shortcut form. In this instance, one image to be stored may be selected from the plurality of dual-captured images.

The image stored in the shortcut form may be output in the form of a thumbnail image 1231 on the auxiliary screen area. Along with this, a popup window 1220 notifying that the image has been stored in the shortcut form may be output on the screen and then disappear.

The user can directly access the corresponding image 1201 at any time by applying a touch input to the thumbnail image 1231 output on the auxiliary screen area while viewing random images or other information.

Figure 14:
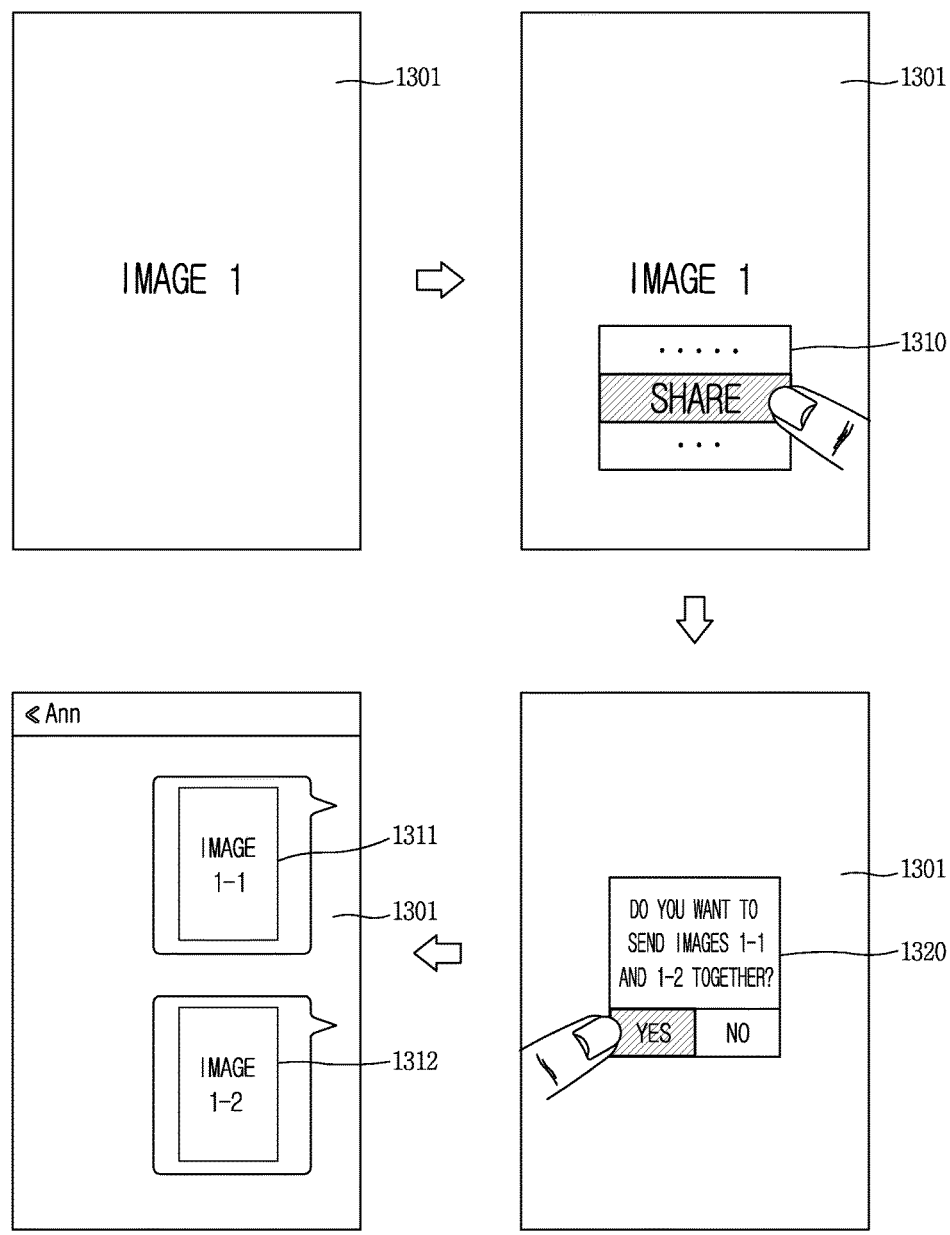
FIG. 14 is a conceptual view illustrating a method of transmitting another dual-captured image together with a specific image upon the transmission of the specific image, in the mobile terminal in accordance with the present invention.

FIG. 14 illustrates an embodiment of a method of transmitting images dual-captured using the plurality of lenses.

As illustrated in FIG. 14, when a touch input is applied to one displayed image 1301 (Image 1) among a plurality of dual-captured images, a menu 1310 for executing a share function may be output. When a share icon is selected on the output menu 1310, a notification window 1320 for the user to decide whether or not to simultaneously transmit even other images, which have been dual-captured but are not currently displayed, may be popped up.

Here, when the simultaneous transmission is selected, other images 1-1, 1-2 which have been dual-captured but are not currently displayed may be transmitted to a counterpart terminal. Accordingly, a plurality of transmitted images 1311 and 1312 may be output on a chat window screen 1301.

As another example, upon transmission of the image 1, the image 1-1 and the image 1-2 may automatically be transmitted together with the image 1. Or, photo images in the form of a list may be provided such that the user can select at least one (the image 1-1 or the image 1-2) from the images to be simultaneously transmitted together.

Meanwhile, although not illustrated, the images, 1, 1-1 and 1-2 may be transmitted at once to the counterpart terminal through a touch input applied to the display image 1301, without the output of the menu window 1310. For example, when a touch input is applied to the image 1, the controller 180 may recognize a displayed face on an area, to which the touch input has been applied, through a prestored face recognition program, retrieve an address book that matches the face stored in the mobile terminal 100, and transmit a plurality of dual-captured images to the counterpart terminal through the single touch input.

As described above, according to at least one of embodiments of the present invention, a plurality of images which are captured in horizontal and vertical directions can simultaneously be acquired using a plurality of lenses in response to a single capturing signal. Also, when a main subject is cut off when captured in a current capture direction, a capturing option can automatically be adjusted such that the main subject can be fully viewed within an image captured in another direction. A plurality of dual-captured images can be output for a user to intuitively recognize capture directions of such images and a screen can be controlled to enable that, thereby providing user convenience. Accordingly, the user can arrange a plurality of images into a desired view style and easily check images of a subject which have been captured in different directions but are not currently displayed. In addition, when one of dual-captured images is transmitted, images captured in different directions can also be transmitted together with the one image, thereby providing convenience of transmitting associated images at once.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a terminal body;
    a memory;
    a display;
    a camera located at one side of the terminal body and having at least a first lens and a second lens; and
    a controller configured to:
        cause the camera to capture a subject via both the first and second lenses in response to receiving an input;
        cause the memory to store a first image captured in a first capture direction via the first lens and a second image captured in a second capture direction via the second lens;
        cause the display to display a thumbnail list, wherein the thumbnail list includes thumbnail images corresponding to images captured in an actual capture direction corresponding to an orientation of the camera among stored images including the first and second images;
        cause the display to display a popup window in response to a touch input applied to a thumbnail image in the thumbnail list, wherein the popup window partially overlaps with the thumbnail image, wherein a hidden image is displayed within the popup window while the touch input is maintained at the thumbnail image, wherein a capture direction of the hidden image is different from a capture direction of the thumbnail image; and
        cause the display to display the hidden image at a region corresponding to the thumbnail image, causing the thumbnail image to be hidden, when the touch input is dragged into the popup window and then released from within the thumbnail image.

2. The terminal of claim 1, wherein:
    the first image corresponds to an image of a preview screen including the subject such that the first capture direction is same as a direction of the image of the preview screen;
    the second capture direction is different from the first capture direction and the direction of the image of the preview screen; and
    when the first capture direction is a vertical direction, the second capture direction is a horizontal direction, and when the first capture direction is the horizontal direction, the second capture direction is the vertical direction.

3. The terminal of claim 2, wherein the subject included in the first image is entirely included in the second image.

4. The terminal of claim 1, further comprising a sensing unit capable of sensing an output direction of the display, wherein the controller is further configured to cause the display to selectively display one of the stored first and second images based on the sensed output direction.

5. The terminal of claim 4, wherein the controller is further configured to switch between the first image and the second image in response to change of the output direction caused by rotation of the terminal body such that the first image is displayed when the output direction corresponds to a portrait direction and the second image is displayed when the output direction corresponds to a landscape direction.

6. The terminal of claim 5, wherein the controller is further configured to restrict the switching when the output direction is changed while a touch input is received via the display.

7. The terminal of claim 1, wherein:
    only one of the stored first and second images that corresponds to the actual capture direction is included in the thumbnail list as a representative image; and
    the other one of the stored first and second images having a capture direction that is different from the actual capture direction is hidden when the thumbnail list is displayed.

8. The terminal of claim 1, wherein the controller is further configured to cause the display to display other images associated with at least one of the thumbnail image or the hidden image in addition to the hidden image on the popup window in a slideshow manner such that each of the other images and the hidden image is displayed one by one.

9. The terminal of claim 8, wherein the controller is further configured to cause the display to display an image displayed on the popup window as a full size image in response to releasing of the touch input from the popup window, the full size image corresponding to the image displayed on the popup window at a moment when the touch input is released.

10. The terminal of claim 1, wherein in response to a preset gesture input received while the first image is displayed, the controller is further configured to:
    cause the display to display the second image instead of the first image; or cause the display to display the first image to which the second image is added.

11. The terminal of claim 1, wherein the thumbnail list includes a first thumbnail image corresponding the stored first image and a second thumbnail image corresponding to the stored second image, wherein the first thumbnail image is displayed in a first shape corresponding to the first capture direction and the second thumbnail image is displayed in a second shape corresponding to the second capture direction.

12. The terminal of claim 11, wherein the controller is further configured to cause the display to display the thumbnail list including only thumbnail images in the first shape in response to a touch input received via the first thumbnail image included in the thumbnail list.

13. The terminal of claim 11, wherein the controller is further configured to:
cause the display to selectively display thumbnail images corresponding to images captured in actual capture directions in response to a touch input received via one thumbnail image in the thumbnail list, the selectively displayed thumbnail images displayed in a distinguishable manner compared to other thumbnail images that are displayed with the selectively displayed thumbnail images; and
set restriction of inputs with respect to the other thumbnail images such that a touch received via the other thumbnail images is not recognized as a touch input.

14. The terminal of claim 1, wherein the controller is further configured to:
cause the display to display a first thumbnail list including only images captured in the first capture direction; and
cause the display to display a second thumbnail list including only images captured in the second capture direction or to display a third thumbnail list including both the images captured in the first capture direction and the images captured in the second capture direction in response to a drag touch input received in a horizontal direction via the thumbnail list.

15. The terminal of claim 1, wherein the controller is further configured to:
cause the display to display the thumbnail list including images captured in the first capture direction; and
cause rows of the thumbnail list to be spaced by a predetermined gap in response to a two-finger touch input received via the thumbnail list and dragged in a first direction such that images captured in the second capture direction are displayed at the gap.

16. The terminal of claim 15, wherein the controller is further configured to cause a first row of the thumbnail list at which the two-finger touch input is received and a second row that is adjacent to the first row in a direction facing the first direction to be spaced apart from each other in response to the two-finger touch input and the dragging in the first direction such that images captured in the second capture direction and corresponding to the first row are displayed at the gap.

17. The terminal of claim 1, wherein the controller is further configured to cause the display to:
display the stored first image;
display information related to the stored second image in response to a preset touch gesture received via the display displaying the first image, the information displayed overlapping a portion of the first image; and
display a quick view of the second image in response to a touch input received via a portion of the display at which the information is displayed.

18. The terminal of claim 1, further comprising a wireless communication unit, wherein the controller is further configured to cause the wireless communication unit to transmit both the first image and the second image in response to a transmission command that is received while one of the first and second images is displayed.

19. A mobile terminal comprising:
a terminal body;
a memory;
a display;
a camera located at one side of the terminal body and having at least a first lens and a second lens; and
a controller configured to:
cause the camera to capture a subject via both the first and second lenses in response to receiving an input;
cause the memory to store a first image captured in a first capture direction via the first lens and a second image captured in a second capture direction via the second lens;
cause the display to display a thumbnail list, wherein the thumbnail list includes thumbnail images corresponding to images captured in an actual capture direction corresponding to an orientation of the camera among stored images including the first and second images;
cause the display to display a popup window in response to a touch input applied to a thumbnail image in the thumbnail list, wherein the popup window partially overlaps with the thumbnail image,
wherein a hidden image is displayed within the popup window while the touch input is maintained at the thumbnail image, wherein a capture direction of the hidden image is different from a capture direction of the thumbnail image; and
perform a different follow-up operation according to a dragged path or a released position of the touch input,
wherein the controller is further configured to:
cause the display to display the hidden image on a display screen without displaying the thumbnail list when the touch input is dragged in to the popup window and then released from within the popup window;
cause the display to stop displaying the popup window when the touch input is released directly from the thumbnail image without being dragged into the popup window; and
cause the display to display the hidden image at a region corresponding to the thumbnail image and stop displaying the thumbnail image when the touch input is dragged into the popup window and then released from within the thumbnail image.

* * * * *